United States Patent
Tamaki

(10) Patent No.: US 9,818,325 B2
(45) Date of Patent: Nov. 14, 2017

(54) DATA PROCESSOR AND METHOD FOR DISPLAYING DATA THEREBY

(71) Applicant: Semiconductor Energy Laboratory Co., Ltd., Kanagawa-ken (JP)

(72) Inventor: Shigeru Tamaki, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 14/525,911

(22) Filed: Oct. 28, 2014

(65) Prior Publication Data
US 2015/0123896 A1 May 7, 2015

(30) Foreign Application Priority Data
Nov. 1, 2013 (JP) .................. 2013-227913

(51) Int. Cl.
| | |
|---|---|
| G06F 3/03 | (2006.01) |
| G09G 3/20 | (2006.01) |
| G06F 1/16 | (2006.01) |
| G06F 3/041 | (2006.01) |
| G06F 3/042 | (2006.01) |
| G06F 3/044 | (2006.01) |
| G06F 3/0482 | (2013.01) |
| G06F 3/0485 | (2013.01) |
| G06F 3/0488 | (2013.01) |
| G06F 3/147 | (2006.01) |

(52) U.S. Cl.
CPC ............. *G09G 3/20* (2013.01); *G06F 1/163* (2013.01); *G06F 1/1643* (2013.01); *G06F 3/042* (2013.01); *G06F 3/044* (2013.01); *G06F 3/0412* (2013.01); *G06F 3/0482* (2013.01); *G06F 3/0485* (2013.01); *G06F 3/04883* (2013.01); *G06F 3/147* (2013.01); *G06F 2203/04102* (2013.01); *G09G 2340/00* (2013.01); *G09G 2340/0464* (2013.01); *G09G 2340/14* (2013.01); *G09G 2370/22* (2013.01); *G09G 2380/02* (2013.01)

(58) Field of Classification Search
USPC ........................................................ 345/156
See application file for complete search history.

(56) References Cited

U.S. PATENT DOCUMENTS

| | | | |
|---|---|---|---|
| 6,597,384 | B1 | 7/2003 | Harrison |
| 8,319,725 | B2 | 11/2012 | Okamoto et al. |
| 8,367,440 | B2 | 2/2013 | Takayama et al. |
| 8,415,208 | B2 | 4/2013 | Takayama et al. |
| 8,427,420 | B2 | 4/2013 | Yamazaki et al. |
| 2002/0034930 | A1 | 3/2002 | Yamazaki et al. |
| 2009/0071952 | A1 | 3/2009 | Kuwabara |

(Continued)

FOREIGN PATENT DOCUMENTS

JP 2012-190794 10/2012

*Primary Examiner* — Carolyn R Edwards
*Assistant Examiner* — Deeprose Subedi
(74) *Attorney, Agent, or Firm* — Husch Blackwell LLP

(57) ABSTRACT

A novel data processor which can display a plurality of images arranged in a predetermined order, a novel method for displaying data, or a novel program is provided. The data processor includes an input/output unit which supplies operation instructions, an arithmetic unit which determines data marked as a starting point according to the operation instructions to generate image data, and a display portion which displays the image data.

12 Claims, 11 Drawing Sheets

(56) References Cited

U.S. PATENT DOCUMENTS

| | | | |
|---|---|---|---|
| 2010/0029327 A1* | 2/2010 | Jee | G04G 17/045 |
| | | | 455/556.1 |
| 2010/0064244 A1* | 3/2010 | Kilpatrick, II | G06F 1/1616 |
| | | | 715/773 |
| 2010/0239907 A1 | 9/2010 | Izumi | |
| 2011/0187681 A1* | 8/2011 | Kim | G06F 3/0488 |
| | | | 345/204 |
| 2012/0217516 A1 | 8/2012 | Hatano et al. | |
| 2013/0044215 A1 | 2/2013 | Rothkopf et al. | |
| 2013/0137483 A1 | 5/2013 | Senoo | |
| 2013/0181955 A1 | 7/2013 | Okamoto et al. | |
| 2013/0214324 A1 | 8/2013 | Takayama et al. | |
| 2013/0222435 A1* | 8/2013 | Choi | G06F 3/0482 |
| | | | 345/684 |
| 2013/0224562 A1 | 8/2013 | Momo | |
| 2013/0314346 A1 | 11/2013 | Yamazaki et al. | |
| 2013/0321473 A1* | 12/2013 | Tsuda | G09G 5/14 |
| | | | 345/684 |
| 2014/0160078 A1* | 6/2014 | Seo | G06F 3/017 |
| | | | 345/175 |
| 2014/0240362 A1 | 8/2014 | Kurita | |

* cited by examiner

FIG. 3A1
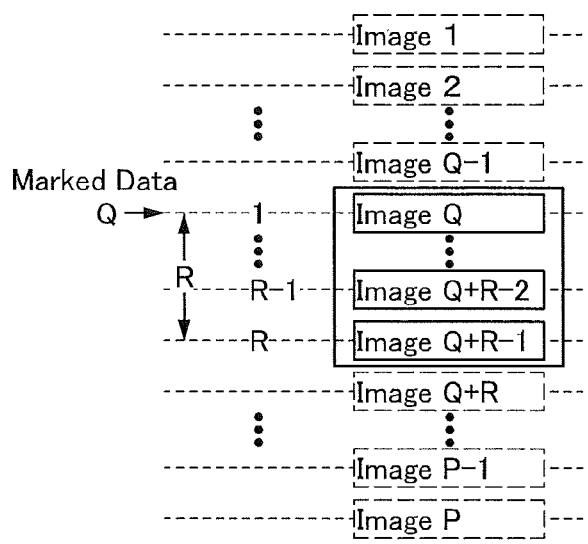
FIG. 3A2
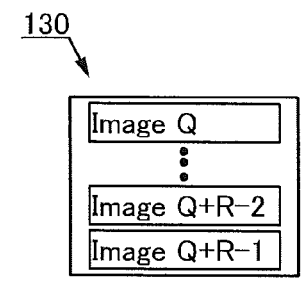
FIG. 3B1
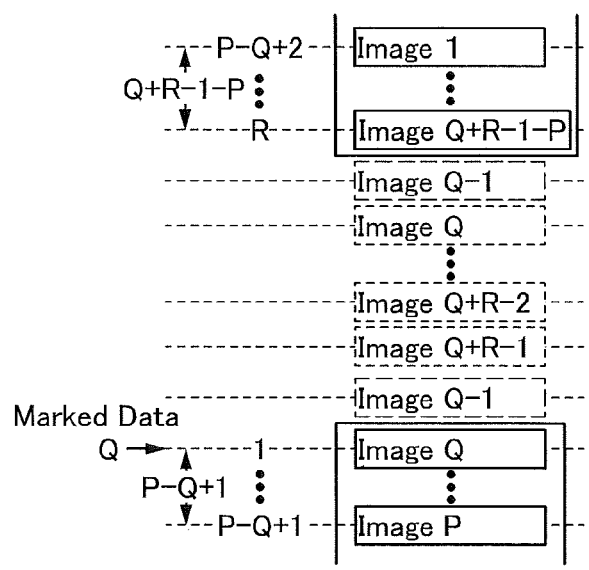
FIG. 3B2
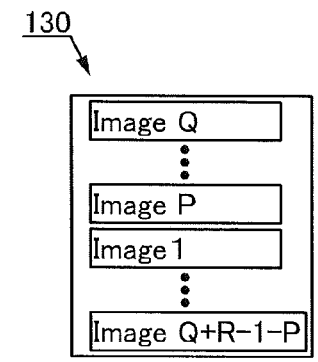

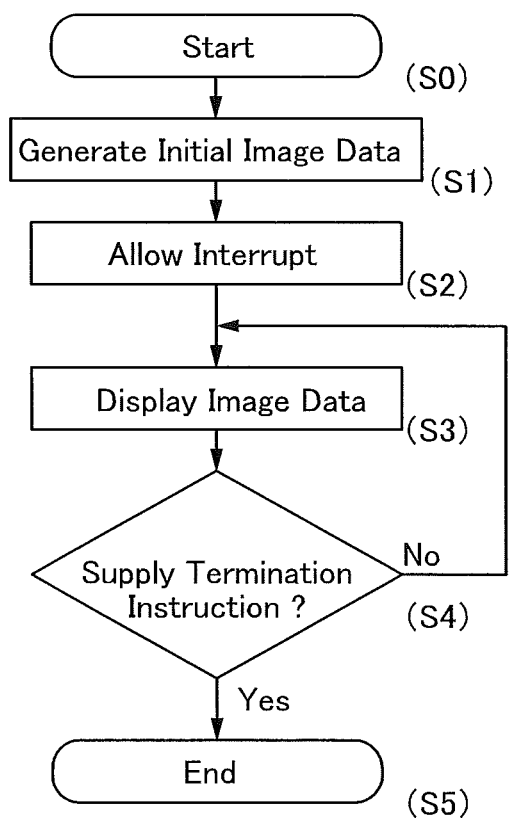

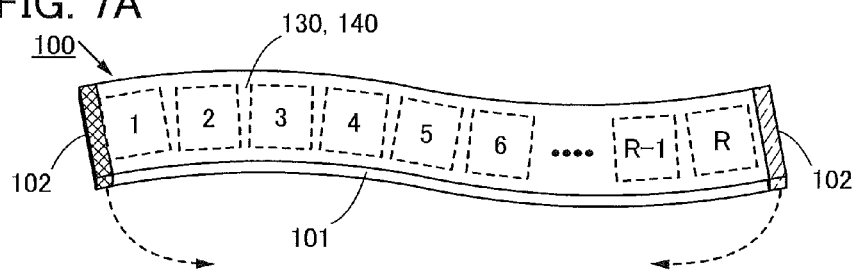
FIG. 7A
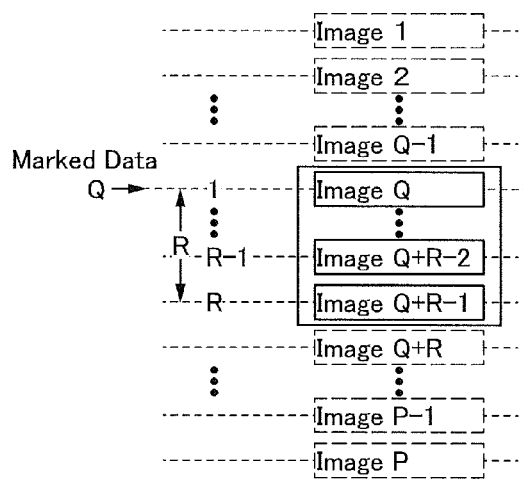
FIG. 7B1
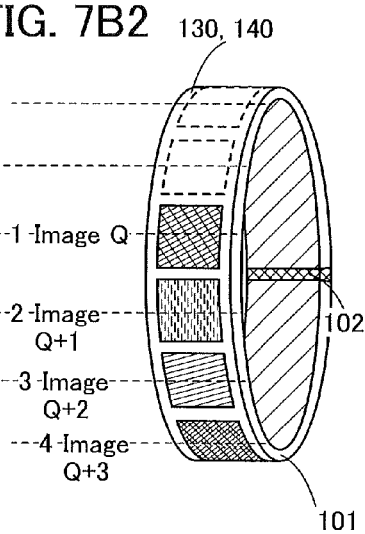
FIG. 7B2
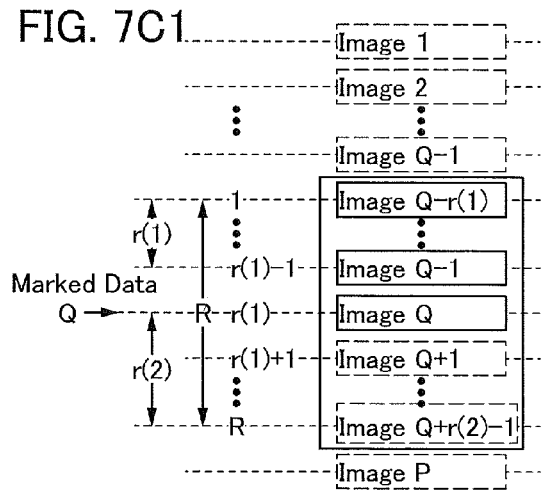
FIG. 7C1
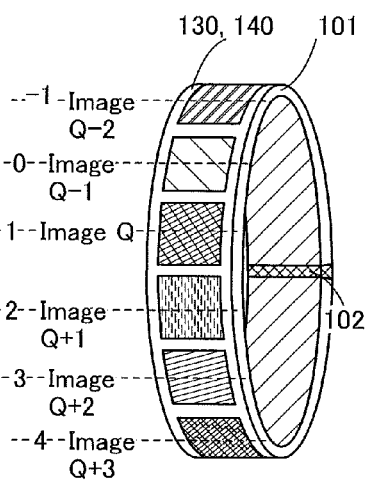
FIG. 7C2

DATA PROCESSOR AND METHOD FOR DISPLAYING DATA THEREBY

BACKGROUND OF THE INVENTION

1. Field of the Invention

The present invention relates to an object, a method, or a manufacturing method. The present invention relates to a process, a machine, manufacture, or a composition of matter, and in particular, a semiconductor device, a display device, a light-emitting device, or a power storage device, or a driving or manufacturing method thereof, for example. In particular, the present invention relates to, for example, a data processor, program, or a data processing method.

2. Description of the Related Art

The social infrastructures relating to data transmission have advanced, and it has become possible to acquire, process, and send out many pieces and various kinds of information not only at home or office but also out of home or office using a data processor.

Portable data processors are under active development in such a background.

Portable data processors are often used outdoors, and force might be accidentally applied by dropping to the data processors and display devices included in them. As an example of a display device that is not easily broken, a display device having high adhesiveness between a structure body by which a light-emitting layer is divided and a second electrode layer is known (Patent Document 1).

REFERENCE

Patent Document

[Patent Document 1] Japanese Published Patent Application No. 2012-190794

SUMMARY OF THE INVENTION

An object of one embodiment of the present invention is to provide a novel data processor and a novel method for displaying data. Another object is to display images selected from a plurality of images on a display portion in a predetermined order according to data marked as a starting point (also referred to as marked data) and to display a plurality of images arranged in a predetermined order.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a data processor including an input/output unit which supplies operation instructions and is supplied with image data and an arithmetic unit which is supplied with the operation instructions and which supplies the image data.

The input/output unit includes an input portion which supplies the operation instructions and a display portion which is supplied with the image data and displays the image data. The arithmetic unit determines data marked as a starting point according to the operation instructions, selects images according to the marked data, and arranges the images in a predetermined order to generate the image data.

Another embodiment of the present invention is a data processor including an input/output unit which supplies operation instructions and is supplied with image data and an arithmetic unit which is supplied with the operation instructions and supplies the image data.

The input/output unit includes an input portion which supplies the operation instructions and a display portion which is supplied with the image data and displays the image data. The arithmetic unit includes an arithmetic portion and a memory portion that stores a program to be executed by the arithmetic portion.

The program includes a first step for generating initial image data, a second step for allowing interrupt, a third step for displaying the image data, a fourth step for determining whether termination instructions are supplied in the interrupt, and a fifth step for terminating the program. In the fourth step, when the termination instructions are supplied, the program moves to the fifth step, whereas when the termination instructions are not supplied, the program moves to the third step.

The interrupt includes a sixth step for determining whether the operation instructions are supplied, a seventh step for updating marked data according to the operation instructions, an eighth step for selecting the predetermined number of images according to the marked data, a ninth step for generating image data containing the images, and a tenth step for recovering from the interrupt. In the sixth step, when the operation instructions are supplied, the program moves to the seventh step, whereas when the operation instructions are not supplied, the program moves to the tenth step.

The data processor of one embodiment of the present invention includes the input/output unit which supplies the operation instructions, the arithmetic unit which determines the marked data according to the operation instructions to generate the image data, and the display portion which displays the image data; thus, images selected from a plurality of images according to the marked data can be displayed on the display portion in a predetermined order. With this structure, a novel data processor which can display a plurality of images arranged in a predetermined order, a novel method for displaying data, or a novel program can be provided.

Another embodiment of the present invention is a data processor including an input/output unit which supplies sensing data and is supplied with image data and an arithmetic unit which is supplied with the sensing data and supplies the image data.

The input/output unit includes a sensor portion which supplies the sensing data and a display portion which is supplied with the image data and displays the image data. The arithmetic unit determines marked data according to the sensing data and selects images according to the marked data and arranges the images in a predetermined order to generate the image data.

Another embodiment of the present invention is a data processor including an input/output unit which supplies sensing data and is supplied with image data and an arithmetic unit which is supplied with the sensing data and supplies the image data.

The input/output unit includes a sensor portion which supplies sensing data and a display portion which is supplied with image data and displays the image data. The arithmetic unit includes an arithmetic portion and a memory portion that stores a program to be executed by the arithmetic unit.

The program includes a first step for generating initial image data, a second step for allowing interrupt, a third step for displaying the image data, a fourth step for determining whether termination instructions are supplied in the interrupt, and a fifth step for terminating the program. In the fourth step, when the termination instructions are supplied, the program moves to the fifth step, whereas when the termination instructions are not supplied, the program moves to the third step.

The interrupt includes a sixth step for determining whether the sensing data is supplied, a seventh step for updating marked data according to the sensing data, an eighth step for selecting the predetermined number of images according to the marked data, a ninth step for generating image data containing the images, and a tenth step for recovering from the interrupt. In the sixth step, when the sensing data is supplied, the program moves to the seventh step, whereas when the sensing data is not supplied, the program moves to the tenth step.

The data processor of one embodiment of the present invention includes the input/output unit which supplies the sensing data, the arithmetic unit which determines the marked data according to the sensing data to generate the image data, and the display portion which displays the image data; thus, images selected from a plurality of images according to the marked data can be displayed on the display portion in a predetermined order. With this structure, a novel data processor which can display a plurality of images arranged in a predetermined order, a novel method for displaying data, or a novel program can be provided.

Another embodiment of the present invention is a data processor including an input/output unit which supplies operation instructions and sensing data and is supplied with image data and an arithmetic unit which is supplied with the operation instructions and the sensing data and supplies the image data.

The input/output unit includes an input portion which supplies operation instructions, a sensor portion which supplies sensing data, and a display portion which is supplied with image data and displays the image data. The arithmetic unit determines marked data according to operation instructions and sensing data and selects images according to the marked data and arranges the images in a predetermined order to generate the image data.

Another embodiment of the present invention is a data processor including an input/output unit which supplies operation instructions and sensing data and is supplied with image data and an arithmetic unit which is supplied with the operation instructions and the sensing data and supplies the image data.

The input/output unit includes an input portion which supplies operation instructions, a sensor portion which supplies sensing data, and a display portion which is supplied with image data and displays the image data. The arithmetic unit includes an arithmetic unit and a memory portion that stores a program to be executed by the arithmetic unit.

The program includes a first step for generating initial image data, a second step for allowing interrupt, a third step for displaying the image data, a fourth step for determining whether termination instructions are supplied in the interrupt, and a fifth step for terminating the program. In the fourth step, when the termination instructions are supplied, the program moves to the fifth step, whereas when the termination instructions are not supplied, the program moves to the third step.

The interrupt includes a sixth step for determining whether the operation instructions are supplied, a seventh step for updating marked data according to the operation instructions, an eighth step for determining whether the sensing data is supplied, a ninth step for updating the marked data according to the sensing data; a tenth step for determining whether the marked data is updated, an eleventh step for selecting the predetermined number of images according to the marked data; a twelfth step for generating image data containing the images; and a thirteenth step for recovering from the interrupt. In the sixth step, when the operation instructions are supplied, the program moves to the seventh step, whereas when the operation instructions are not supplied, the program moves to the eighth step. In the eighth step, when the sensing data is supplied, the program moves to the tenth step, whereas when the sensing data is not supplied, the program moves to the ninth step. In the tenth step, when the marked data is updated, the program moves to the eleventh step, whereas when the marked data is not updated, the program moves to the thirteenth step.

The data processor of one embodiment of the present invention includes the arithmetic unit which determines the marked data according to the operation instructions supplied by the input portion and/or the sensing data supplied by the sensor portion and which generates image data according to the marked data, and the display portion which displays the image data. With this structure, images selected from a plurality of images according to the marked data can be displayed on the display portion in a predetermined order. With this structure, a novel data processor which can display a plurality of images arranged in a predetermined order, a novel method for displaying data, or a novel program can be provided.

Another embodiment of the present invention is the data processor in which the display portion is flexible.

The data processor of one embodiment of the present invention includes a housing on which the display portion is mounted. The housing can form a ring.

The data processor of one embodiment of the present invention includes the display portion on the ring-shaped housing; thus, images selected from a plurality of images according to the marked data can be displayed in a predetermined order on the display portion along the ring-shaped housing. With this structure, a novel data processor which can display a plurality of images arranged in a predetermined order, or a novel method for displaying data can be provided.

According to one embodiment of the present invention, a novel data processor or a novel method for displaying data can be provided.

BRIEF DESCRIPTION OF THE DRAWINGS

FIGS. 3A1, 3A2, 3B1, and 3B2 are schematic views each showing a method by which an arithmetic portion of a data processor of one embodiment generates images and the generated images.

FIG. 4 is a flow chart showing a program to be executed by an arithmetic portion of a data processor of one embodiment.

FIGS. 7A, 7B1, 7B2, 7C1, and 7C2 are schematic views each showing a structure of a data processor of one embodiment and a method by which an arithmetic portion generates images.

DETAILED DESCRIPTION OF THE INVENTION

Figure 1:
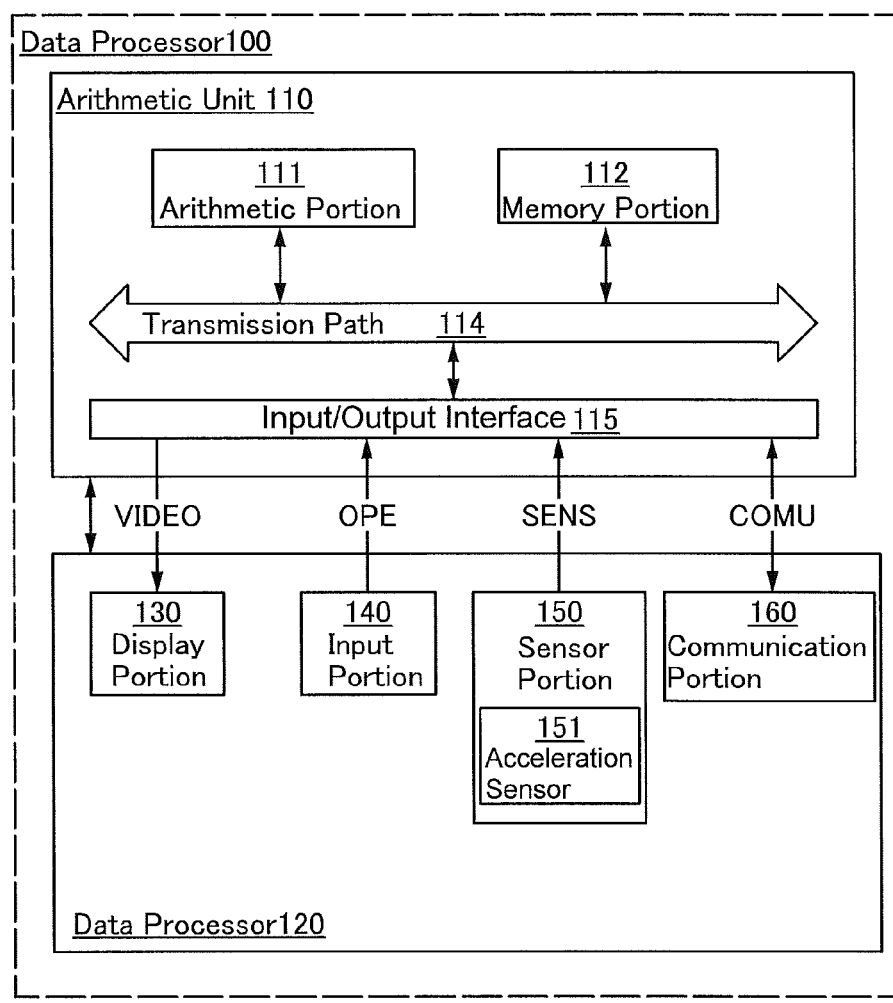
FIG. 1 is a block diagram illustrating a structure of a data processor of one embodiment.

A data processor of one embodiment of the present invention includes an input/output unit which supplies operation instructions, an arithmetic unit which determines marked data according to the operation instructions to generate image data, and a display portion which displays the image data.

With this structure, images selected from a plurality of images according to the marked data can be displayed on the display portion in a predetermined order. As a result, a novel data processor which can display a plurality of images arranged in a predetermined order, a novel method for displaying data, or a novel program can be provided.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated.

Embodiment 1

In this embodiment, a structure of a data processor of one embodiment of the present invention will be described with reference to FIG. 1, FIG. 2, FIGS. 3A1, 3A2, 3B1, and 3B2, FIG. 4, and FIGS. 5A and 5B.

FIG. 1 is a block diagram illustrating the structure of the data processor of one embodiment of the present invention.

Figure 2:
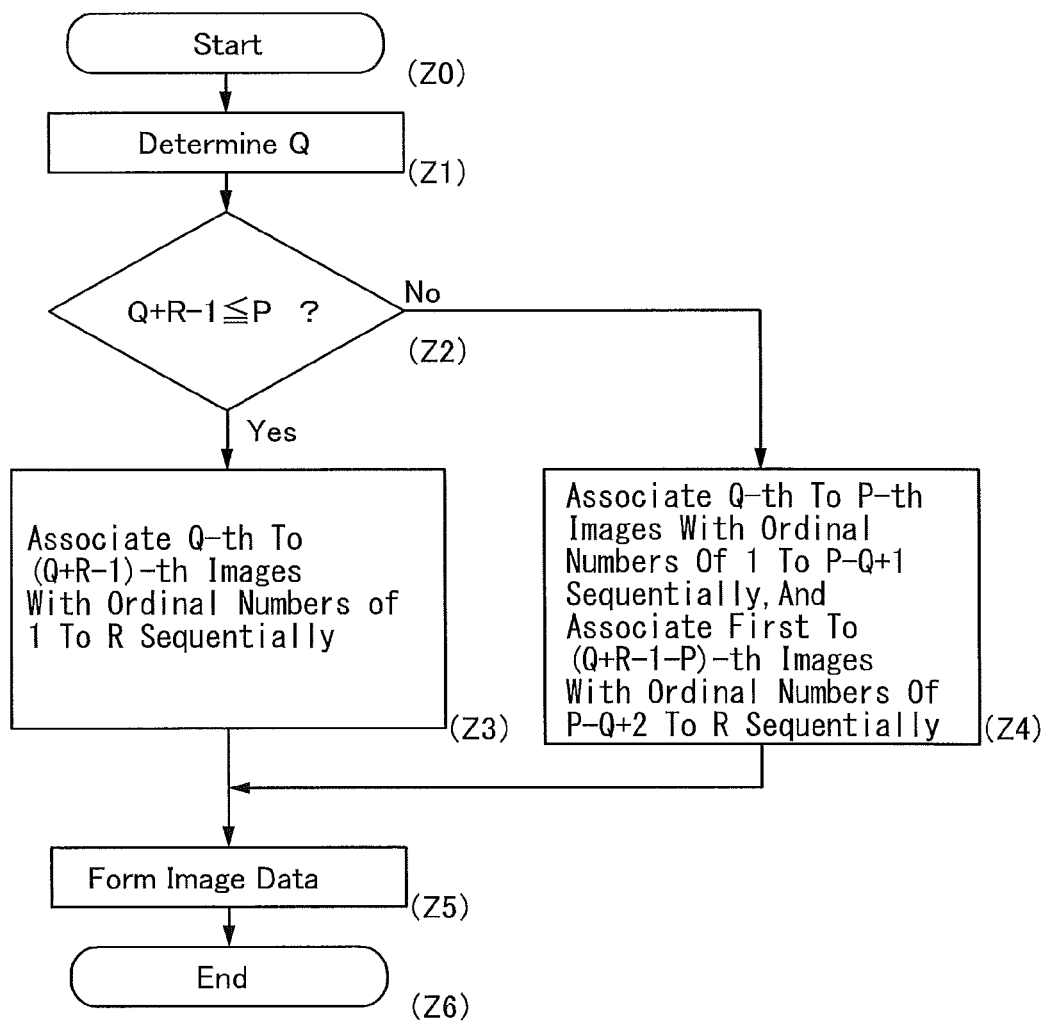
FIG. 2 is a flow chart showing a method by which an arithmetic portion of a data processor of one embodiment generates an image.

FIG. 2 is a flow chart of a method by which the data processor of one embodiment of the present invention generates images.

FIGS. 3A1 and 3B1 are schematic views each showing a method by which the data processor of one embodiment of the present invention selects images from a plurality of images. FIGS. 3A2 and 3B2 are schematic views of the images which are generated by the data processor of one embodiment of the present invention.

Figure 5A:
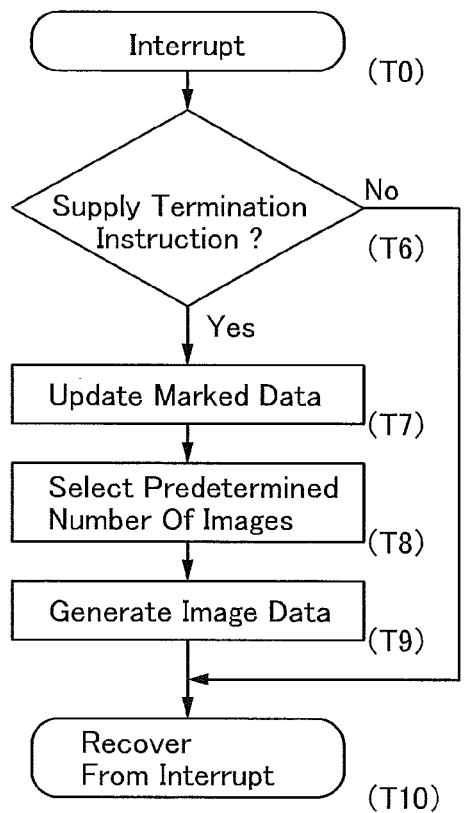
FIGS. 5A and 5B are flow charts showing a program to be executed by an arithmetic portion of a data processor of one embodiment.
Figure 5B:
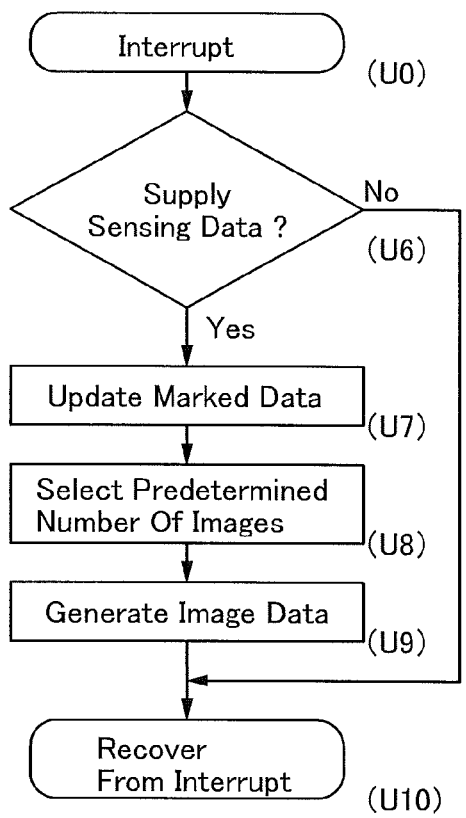

FIG. 4 and FIGS. 5A and 5B are each a flow chart of a program which is executed by an arithmetic portion in an arithmetic unit of the data processor of one embodiment of the present invention.

Structure Example 1 of Data Processor

A data processor 100 described in this embodiment includes an input/output unit 120 which supplies operation instructions OPE and to which image data VIDEO is supplied, and an arithmetic unit 110 to which operation instructions OPE are supplied and which supplies image data VIDEO (see FIG. 1).

The input/output unit 120 includes an input portion 140 which supplies operation instructions OPE and a display portion 130 to which image data VIDEO is supplied and which displays image data VIDEO.

The arithmetic unit 110 determines data marked as a starting point according to operation instructions OPE, selects images according to the marked data, and arranges the images in a predetermined order to generate image data VIDEO.

The data processor 100 includes the input/output unit 120 which supplies operation instructions OPE, the arithmetic unit 110 which determines marked data according to operation instructions OPE to generate image data VIDEO, and the display portion which displays image data VIDEO; thus, images selected from a plurality of images according to the marked data can be displayed on the display portion 130 in a predetermined order. With this structure, a novel data processor which can display a plurality of images arranged in a predetermined order, a novel method for displaying data, or a novel program can be provided.

The input/output unit 120 may include a sensor portion 150 which supplies sensing data SENS and a communication portion 160 which supplies and is supplied with data COMU.

The arithmetic unit 110 includes an arithmetic portion 111, a memory portion 112, a transmission path 114, and an input/output interface 115.

Units constituting the data processor 100 are described below. Note that these units cannot be clearly distinguished from each other and one unit also serves as another unit or includes part of another unit in some cases.

For example, a display panel with which a touch panel is overlapped serves as both the input portion 140 and the display portion 130.

Overall Structure

The data processor 100 includes the input/output unit 120 and the arithmetic unit 110.

Input/Output Unit

The input/output unit 120 supplies operation instructions OPE and is supplied with image data VIDEO.

The input/output unit 120 includes the input portion 140 and the display portion 130.

The input/output unit 120 may also include the sensor portion 150 and the communication portion 160.

Operation Instructions

Operation instructions OPE are data or a signal which is supplied by the input/output unit 120 and are associated with a predetermined operation executed by the arithmetic portion 111 in advance.

For example, operation instructions OPE are associated with instructions to execute a program, to terminate a program, or to provide conditions or values that are used during program execution, for example.

Specific examples of operation instructions OPE are instructions to supply data marked as a starting point, to update the data, and to determine the data according to supplied coordinate data or the like.

Input Portion

The input portion 140 supplies operation instructions OPE.

Any of various human interface devices or the like can be used as the input portion 140.

For example, a keyboard, a mouse, a touch sensor, a microphone, a camera, or the like can be used as the input portion 140.

In particular, operation using a pointer helps intuitive understanding. Explained below is a case where a touch panel including a plurality of touch sensors is used as the input portion 140.

A user of the data processor 100 can make a various gestures (e.g., tap, drag, swipe, and pinch in) using his/her finger as a pointer on the touch panel.

The arithmetic unit 110, for example, analyzes data on position, track, or the like of the finger on the touch panel and determines that a specific gesture is made under predetermined conditions.

With a specific gesture associated with predetermined operation instructions OPE, the user can give the predetermined operation instructions OPE by the gesture.

For example, a gesture associated with instructions to increase or decrease the value of data marked as a starting point just by one or a gesture associated with instructions to increase or decrease the value of the data marked as a starting point just by ten can be predetermined.

Display Portion

The display portion 130 displays processing results. A user of the data processor 100 looks at the display to see the processing results.

The display portion 130 includes a display element. As the display element, for example, liquid crystal elements, light-emitting diodes, organic electroluminescent elements, a variety of display elements such as display elements (electronic ink) that perform display by an electrophoretic method, an electronic liquid powder method, or the like; MEMS shutter display elements; and optical interference type MEMS display elements can be used.

Specific examples of a structure that can be employed in the display portion 130 are described in Embodiments 5 and 6.

The sensor portion 150 senses the states of the data processor 100 and the circumstances and supplies sensing data SENS.

The sensor portion 150 includes an acceleration sensor 151, for example. The sensor portion 150 may include a sensor for sensing a cardinal direction, pressure, a global positioning system (GPS) signal, temperature, humidity, or the like. Data sensed by such a sensor may be supplied as sensing data SENS.

Communication Portion

The communication portion 160 supplies or is supplied with data COMU.

For example, the communication portion 160 can supply data COMU to a device or a communication network outside the data processor 100, or can supply data COMU of the device or the communication network outside the data processor 100 to the arithmetic unit 110.

Data COMU can contain images, text, music, and operation instructions such as instructions to generate or erase image data VIDEO that is displayed on the display portion 130.

A hub, a router, a modem, or the like can be used as the communication portion 160. Note that not only a wired connection, but also a wireless connection (e.g., radio waves, infrared rays) can be employed.

Arithmetic Unit

The arithmetic unit 110 is supplied with operation instructions OPE and supplies image data VIDEO.

The arithmetic unit 110 determines data marked as a starting point according to operation instructions OPE, selects a plurality of images according to the marked data, and then arranges the selected images in a predetermined order to generate image data VIDEO.

For example, the arithmetic unit 110 arranges R images selected from P images in a predetermined order to generate image data VIDEO.

The arithmetic unit 110 includes the arithmetic portion 111, the memory portion 112, the input/output interface 115, and the transmission path 114.

Arithmetic Portion

The arithmetic portion 111 executes instructions or the like contained in a program stored in the memory portion 112. For example, the arithmetic portion 111 executes the program and generates image data VIDEO according to operation instructions OPE.

Example of Program

Explained here is a program to select R images (Q-th to (Q+R−1)-th images) from P images (first to P-th images), and generate image data VIDEO in which the selected images are arranged in numerical order (see FIG. 2 and FIGS. 3A1 to 3B2).

Note that P, Q, R are each a natural number greater than or equal to 2. Note that Q is less than or equal to P and R is less than P, and is data marked as a starting point in this embodiment.

In a first step, Q is determined according to operation instructions OPE (see Z1 in FIG. 2, and FIGS. 3A1 and 3B1).

For example, operation instructions OPE to supply and determine Q using a keyboard or the like may be given. Alternatively, operation instructions may be given by the coordinates or the moving speed of finger that is sensed by a touch panel or the like to determine Q. In that case, moving directions of a finger touching the touch panel can be associated with different operation instructions.

Operation instructions OPE to supply and determine Q by a gesture may be given. Specifically, a touch panel senses a gesture (e.g., tap, drag, swipe, or pinch-in) made by a finger used as a pointer, so that operation instructions OPE can be given. Note that the input portion 140 may supply coordinate data of a finger or the like touching the input portion 140 and the arithmetic unit 110 may analyze the supplied coordinate data and associate the results with operation instructions OPE.

For example, a gesture of an upward finger movement on the touch panel is associated with instructions to increase Q by 1 and a gesture of a downward finger movement is associated with instructions to reduce Q by 1, so that the images can be scrolled.

Alternatively, for example, a gesture of a finger movement to the right on the touch panel is associated with instructions to increase Q by 10 and a gesture of a finger movement to the left is associated with instructions to reduce Q by 10.

Further alternatively, for example, a gesture of a finger movement to the right on the touch panel is associated with instructions to jump to the closest marked value by increasing Q, and a gesture of a finger movement to the left on the touch panel is associated with instructions to jump to the closest marked valued by reducing Q, so that an operation to jump to a marked image can be achieved.

In a second step, when (Q+R−1) is smaller than or equal to P, the program moves to a third step, whereas when (Q+R−1) is larger than P, the program moves to a fourth step (Z2 in FIG. 2).

In the third step, Q-th to (Q+R−1)-th images are sequentially associated with ordinal numbers of 1 to R (Z3 in FIG. 2 and FIG. 3A1).

In the fourth step, Q-th to P-th images are sequentially associated with ordinal numbers of 1 to (P−Q+1), and first to (Q+R−1−P)-th images are sequentially associated with ordinal numbers of (P−Q+2) to R (Z4 in FIG. 2 and FIG. 3B1).

In a fifth step, the image associated with the ordinal number of 1 to the image associated with the ordinal number of R are arranged in numerical order to form image data VIDEO (Z5 in FIG. 2).

In a sixth step, the program terminates (Z6 in FIG. 2).

Note that FIG. 3A2 shows the display portion 130 displaying image data VIDEO when (Q+R−1) is smaller than or equal to P, and FIG. 3B2 shows the display portion 130 displaying image data VIDEO when (Q+R−1) is larger than P.

Memory Portion

The memory portion 112 stores a program to be executed by the arithmetic portion 111.

A mask ROM, an OTP-ROM, a UV-EPROM, an EEPROM, a flash ROM, a hard disk, or the like can be used as the memory portion 112.

When the memory portion 112 is rewritable, a user of the data processor 100 can write a program obtained via a telecommunication line or the like into the memory portion 112.

Input/Output Interface and Transmission Path

The input/output interface 115 supplies data or is supplied with data. The transmission path 114 supplies data or is supplied with data.

Structure Example 2 of Data Processor

In this embodiment, another structure of the data processor of one embodiment of the present invention will be described with reference to FIG. 1, FIG. 4, and FIG. 5A.

FIG. 4 and FIG. 5A are each a flow chart showing a program to be executed by the arithmetic portion 111 in the arithmetic unit 110 of the data processor 100 of one embodiment of the present invention.

The data processor 100 described in this embodiment includes the input/output unit 120 which supplies operation instructions OPE and to which image data VIDEO is supplied and the arithmetic unit 110 to which operation instructions OPE is supplied and supplies image data VIDEO (see FIG. 1).

The input/output unit 120 includes the input portion 140 which supplies operation instructions OPE and the display portion 130 to which image data VIDEO is supplied and which displays image data VIDEO.

The arithmetic unit 110 includes the arithmetic portion 111 and the memory portion 112 that stores a program to be executed by the arithmetic portion 111.

A program which is stored in the memory portion 112 included in the arithmetic unit 110 of the data processor 100 and is executed by the arithmetic portion 111 is described in detail below and the above description is referred to for the other similar parts.

Example of Program

Here, an example of a program stored in the memory portion 112 is described.

In a first step, initial image data is generated (S1 in FIG. 4).

In a second step, interrupt is allowed (S2 in FIG. 4). Note that when interrupt is allowed, the arithmetic portion 111 can receive instructions to execute interrupt; thus, the arithmetic portion 111 that has received the instructions to execute interrupt stops the main processing and executes interrupt. For example, the arithmetic portion 111 that has received an event associated with the instructions executes interrupt and stores the execution result in the memory portion 112. As a result, the arithmetic portion 111 can execute the main processing according to interrupt execution results when recovering from interrupt to the main processing.

In a third step, image data is displayed (S3 in FIG. 4).

In a fourth step, program moves to a fifth step when termination instructions of interrupt are supplied, whereas program goes back to the third step when termination instructions are not supplied (S4 in FIG. 4).

In a fifth step, the program terminates (S5 in FIG. 4).

Interrupt includes the following steps.

In a sixth step, program moves to a seventh step when operation instructions are supplied, whereas program moves to a tenth step when operation instructions are not supplied (T6 in FIG. 5A).

For example, when operation instructions OPE to update data marked as a starting point from Q(1) to Q(2) are supplied, the program moves to the seventh step.

In a seventh step, the marked data is updated according to the operation instructions (T7 in FIG. 5A).

For example, the marked data is updated from Q(1) to Q(2).

In an eighth step, the predetermined number of images is selected according to the updated marked data (T8 in FIG. 5A).

For example, Q(2) to (Q(2)+R) images are sequentially selected and associated with ordinal numbers of 1 to R.

In a ninth step, image data containing the selected images is generated (T9 in FIG. 5A).

For example, images associated with the ordinal numbers of 1 to R are arranged in numerical order to form image data VIDEO.

For example, image data VIDEO can be generated so that the image associated with the ordinal number 1 is always located on the top of the display portion 130. In this case, when data is updated from Q(1) to Q(2), image data VIDEO for displaying the Q(1)-th image at the top of the display portion 130 is updated to image data VIDEO for displaying the Q(2) image at the top of the display portion 130.

In another case, operation instructions to specify a position to display the image associated with the ordinal number 1, that is, the Q-th image, may be supplied.

In the tenth step, program is recovered from interrupt (T10 in FIG. 5A).

The data processor 100 includes the input/output unit 120 which supplies operation instructions OPE, the arithmetic unit 110 which determines marked data according to operation instructions OPE to generate image data VIDEO, and the display portion which displays image data VIDEO; thus, images selected from a plurality of images according to the marked data can be displayed on the display portion 130 in a predetermined order. With this structure, a novel data processor which can display a plurality of images arranged in a predetermined order, a novel method for displaying data, or a novel program can be provided.

Note that this embodiment can be combined with any of the other embodiments in this specification as appropriate.

Embodiment 2

In this embodiment, a structure of a data processor of one embodiment of the present invention will be described with reference to FIG. 1, FIG. 2, FIGS. 3A1 to 3B2, FIG. 4, and FIGS. 5A and 5B.

Structure Example 1 of Data Processor

The data processor 100 described in this embodiment includes the input/output unit 120 which supplies sensing data SENS and to which image data VIDEO is supplied and the arithmetic unit 110 to which sensing data SENS is supplied and supplies image data VIDEO.

The input/output unit 120 includes the sensor portion 150 which supplies sensing data SENS and the display portion 130 which is supplied with image data VIDEO and displays image data VIDEO.

The arithmetic unit 110 determines marked data according to sensing data SENS and selects images according to the marked data and arranges the images in a predetermined order to generate image data VIDEO.

The data processor 100 includes the input/output unit 120 which supplies sensing data SENS, the arithmetic unit 110 which determines marked data according to sensing data SENS to generate image data VIDEO, and the display portion which displays image data VIDEO; thus, images selected from a plurality of images according to the marked data can be displayed on the display portion 130 in a predetermined order. With this structure, a novel data processor which can display a plurality of images arranged in a predetermined order or a novel method for displaying data can be provided.

The input/output unit 120 may include the input portion 140 which supplies operation instructions OPE and the communication portion 160 which supplies and is supplied with data COMU.

The arithmetic unit 110 includes the arithmetic portion 111, the memory portion 112, the transmission path 114, and the input/output interface 115.

Units constituting the data processor 100 are described below. Note that these units cannot be clearly distinguished from each other and one unit also serves as another unit or includes part of another unit in some cases.

For example, a display panel with which a touch panel is overlapped serves as both the input portion 140 and the display portion 130.

The data processor 100 in this embodiment is different from the data processor 100 in Embodiment 1 in that data marked as a starting point according to sensing data SENS that is supplied from the sensor portion 150, which is included in the data processor 100. The different parts will be described in detail below, and the above description is referred to for the similar parts.

Input/Output Unit

The input/output unit 120 supplies sensing data SENS and is supplied with image data VIDEO.

The input/output unit 120 includes the sensor portion 150 and the display portion 130.

The input/output unit 120 may include the input portion 140 or the communication portion 160.

The sensor portion 150 senses the states of the data processor 100 and the circumstances and supplies sensing data SENS.

Note that the sensor portion 150 includes the acceleration sensor 151, and sensing data SENS containing data on a direction, pressure, a global positioning system (GPS) signal, temperature, humidity, or the like. Data sensed by such a sensor may be supplied as sensing data SENS.

Arithmetic Unit

The arithmetic unit 110 is supplied with sensing data SENS and supplies image data VIDEO.

Arithmetic Portion

The arithmetic portion 111 executes instructions contained in a program stored in the memory portion 112. For example, the arithmetic portion 111 executes the program and generates image data VIDEO according to sensing data SENS.

Example of Program

Explained here is a program to select R images (i.e., Q-th to (Q+R−1)-th images) from P images (first to P-th images), and to generate image data VIDEO in which the selected images are arranged in numerical order (see FIG. 2 and FIGS. 3A1 to 3B2).

Note that P, Q, R are each a natural number greater than or equal to 2. Note that Q is less than or equal to P and R is less than P, and is data marked as a starting point in this embodiment.

In the first step, Q is determined according to operation instructions OPE (see Z1 in FIG. 2, and FIGS. 3A1 and 3B1).

For example, the sensor portion 150 including the acceleration sensor 151 may be provided in the data processor 100 to give operation instructions OPE to supply and determine Q according to the inclination of the data processor 100.

Specifically, operation instructions OPE with which Q is updated to be larger as the inclination of the data processor 100 increases may be supplied. Alternatively, operation instructions OPE to increase Q when the data processor 100 is inclined to the front and to decrease Q when the data processor 100 is inclined to the back may be supplied. Inclination directions of the data processor 100 can be associated with different operation instructions. Note that operation instructions described in Embodiment 1 can be used as the different operation instructions.

The descriptions of the operations in the second to sixth steps are omitted because they are the same as those in the program described in Embodiment 1 with reference to FIG. 2 and FIGS. 3A1 to 3B2.

Structure Example 2 of Data Processor

In this embodiment, another structure of the data processor of one embodiment of the present invention will be described with reference to FIG. 4 and FIG. 5B.

FIG. 4 and FIG. 5B are each a flow chart showing a program to be executed by the arithmetic portion 111 in the arithmetic unit 110 of the data processor 100 of one embodiment of the present invention.

The data processor 100 described in this embodiment includes the input/output unit 120 which supplies sensing data SENS and to which image data VIDEO is supplied and the arithmetic unit 110 to which sensing data SENS is supplied and supplies image data VIDEO.

The input/output unit 120 includes the sensor portion 150 supplying sensing data and the display portion 130 to which image data VIDEO is supplied and which displays image data VIDEO (see FIG. 1).

The arithmetic unit includes an arithmetic portion and a memory portion that stores a program to be executed by the arithmetic portion.

A program which is stored in the memory portion 112 included in the arithmetic unit 110 of the data processor 100 and is executed by the arithmetic portion 111 is described in detail below and the above description is referred to for the other similar structures.

Example of Program

Here, an example of a program stored in the memory portion 112 is described.

In the first step, initial image data is generated (S1 in FIG. 4).

In the second step, interrupt is allowed (S2 in FIG. 4).

In the third step, image data is displayed (S3 in FIG. 4).

In the fourth step, when program moves to the fifth step when termination instructions of interrupt are supplied, whereas program goes back to the third step when termination instructions are not supplied (S4 in FIG. 4).

In the fifth step, the program terminates (S5 in FIG. 4).

Interrupt includes the following steps.

In a sixth step, program moves to a seventh step when sensing data is supplied, whereas program moves to the tenth step when sensing data is not supplied (U6 in FIG. 5B).

In a seventh step, marked data is updated according to the sensing data (U7 in FIG. 5B).

In an eighth step, the predetermined number of images is selected according to the marked data (U8 in FIG. 5B).

In a ninth step, image data is generated (U9 in FIG. 5B).

In a tenth step, the operation is recovered from interrupt (U10 in FIG. 5B).

The data processor 100 includes the input/output unit 120 which supplies sensing data SENS, the arithmetic unit 110 which determines marked data according to sensing data SENS to generate image data VIDEO, and the display portion which displays image data VIDEO; thus, images selected from a plurality of images according to the marked data can be displayed on the display portion 130 in a predetermined order. With this structure, a novel data processor which can display a plurality of images arranged in a predetermined order, a novel method for displaying data, or a novel program can be provided.

Note that this embodiment can be combined with any of the other embodiments in this specification as appropriate.

Embodiment 3

In this embodiment, a structure of a data processor of one embodiment of the present invention will be described with reference to FIG. 1, FIG. 2, FIGS. 3A1 to 3B2, FIG. 4, and FIG. 6.

Structure Example 1 of Data Processor

The data processor 100 described in this embodiment includes the input/output unit 120 which supplies operation instructions OPE and sensing data SENS and to which image data VIDEO is supplied and the arithmetic unit 110 to which operation instructions OPE and sensing data SENS are supplied and supplies image data VIDEO (see FIG. 1).

The input/output unit 120 includes the input portion 140 which supplies operation instructions OPE, the sensor portion 150 which supplies sensing data SENS, and the display portion 130 which is supplied with image data VIDEO and displays image data VIDEO.

The arithmetic unit 110 determines marked data according to operation instructions OPE and sensing data SENS and selects images according to marked data and arranges the images in a predetermined order to generate image data VIDEO.

The data processor 100 includes the arithmetic unit 110 which determines marked data according to operation instructions OPE supplied from the input portion 140 and/or sensing data SENS supplied from the sensor portion 150 to generate image data VIDEO according to the marked data, and the display portion 130 which displays image data VIDEO; thus, images selected from a plurality of images according to the marked data can be displayed on the display portion 130 in a predetermined order. With this structure, a novel data processor which can display a plurality of images arranged in a predetermined order or a novel method for displaying data can be provided.

The arithmetic unit 110 includes the arithmetic portion 111, the memory portion 112, the transmission path 114, and the input/output interface 115.

Units constituting the data processor 100 are described below. Note that these units cannot be clearly distinguished from each other and one unit also serves as another unit or includes part of another unit in some cases.

For example, a display panel with which a touch panel is overlapped serves as both the input portion 140 and the display portion 130.

The data processor 100 in this embodiment is different from the data processor 100 in Embodiment 1 or 2 in that data marked as a starting point according to operation instructions OPE and sensing data SENS supplied from the input portion 140 and the sensor portion 150, respectively, which are included in the data processor 100. The different parts will be described in detail below, and the above description is referred to for the similar parts.

Input/Output Unit

The input/output unit 120 supplies operation instructions OPE and sensing data SENS and is supplied with image data VIDEO.

The input/output unit 120 includes the input portion 140, the sensor portion 150, and the display portion 130.

The input/output unit 120 may include the communication portion 160.

Arithmetic Unit

The arithmetic unit 110 is supplied with operation instructions OPE and sensing data SENS and supplies image data VIDEO.

Arithmetic Portion

The arithmetic portion 111 executes instructions contained in a program stored in the memory portion 112. For example, the arithmetic portion 111 executes the program and generates image data VIDEO according to operation instructions OPE and sensing data SENS.

Example of Program

Explained here is a program to select R images (i.e., Q-th to (Q+R−1)-th images) from P images (first to P-th images), and to generate image data VIDEO in which the selected images are arranged in numerical order (see FIG. 2 and FIGS. 3A1 to 3B2).

Note that P, Q, R are each a natural number greater than or equal to 2. Note that Q is less than or equal to P and R is less than P, and is data marked as a starting point in this embodiment.

In the first step, Q is determined according to operation instructions OPE (see Z1 in FIG. 2, and FIGS. 3A1 and 3B1).

For example, operation instructions OPE to supply and determine the value of Q may be supplied by a keyboard, or a gesture in the case of using a touch panel.

For example, the sensor portion 150 including the acceleration sensor 151 may be provided in the data processor 100 to give operation instructions to supply and determine Q according to the inclination of the data processor 100.

The descriptions of the operations in the second to sixth steps are omitted because they are the same as those in the program described in Embodiment 1 or 2 with reference to FIG. 2 and FIGS. 3A1 to 3B2.

Structure Example 2 of Data Processor

In this embodiment, another structure of the data processor of one embodiment of the present invention will be described with reference to FIG. 4 and FIG. 6.

Figure 6:
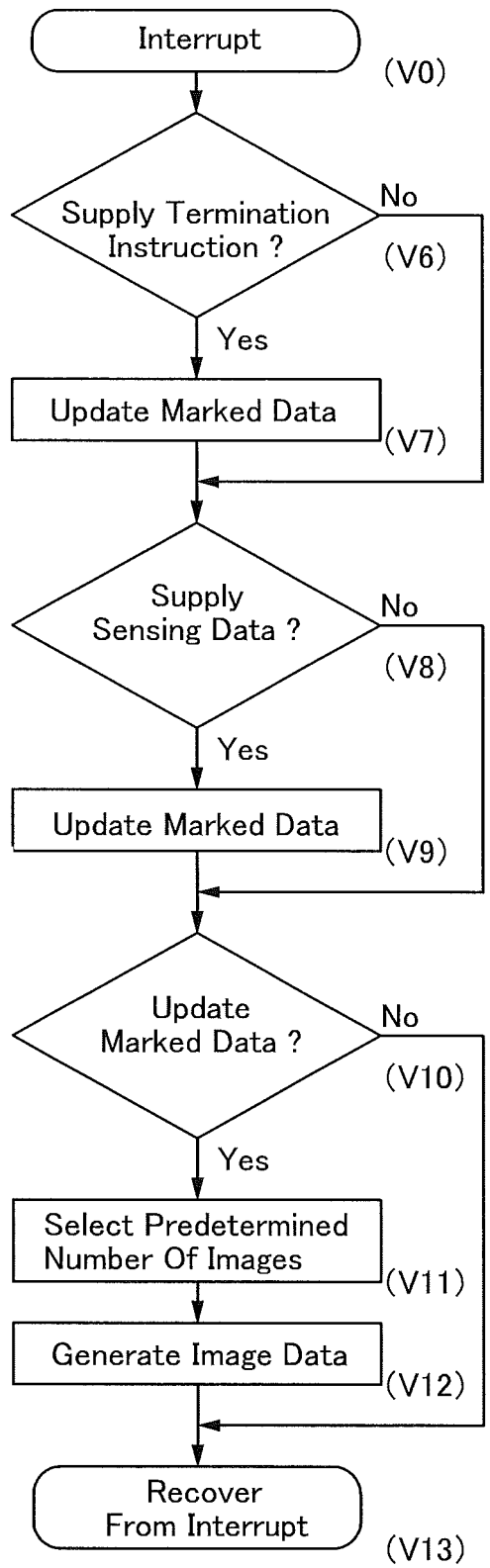
FIG. 6 is a flow chart showing a program to be executed by an arithmetic portion of a data processor of one embodiment.

FIG. 4 and FIG. 6 are each a flow chart showing a program to be executed by the arithmetic portion 111 in the arithmetic unit 110 of the data processor 100 of one embodiment of the present invention.

A program which is stored in the memory portion 112 included in the arithmetic unit 110 of the data processor 100 and is executed by the arithmetic portion 111 is described in detail below and the above description is referred to for the other similar parts.

The data processor 100 described in this embodiment includes the input/output unit 120 which supplies operation instructions OPE and sensing data SENS and to which image data VIDEO is supplied and the arithmetic unit 110 to which operation instructions OPE and sensing data SENS is supplied and supplies image data VIDEO (see FIG. 1).

The input/output unit 120 includes the input portion 140 which supplies operation instructions OPE, the sensor portion 150 which supplies sensing data SENS, and the display portion 130 to which image data VIDEO is supplied and which displays image data VIDEO.

The arithmetic unit 110 includes the arithmetic portion 111 and the memory portion 112 that stores a program to be executed by the arithmetic portion 111.

Here, an example of a program stored in the memory portion 112 is described.

In the first step, initial image data is generated (S1 in FIG. 4).

In the second step, interrupt is allowed (S2 in FIG. 4).

In the third step, image data is displayed (S3 in FIG. 4).

In the fourth step, when program moves to the fifth step when termination instructions of interrupt are supplied, whereas program goes back to the third step when termination instructions are not supplied (S4 in FIG. 4).

In the fifth step, the program terminates (S5 in FIG. 4).

Interrupt includes the following steps.

In a sixth step, program moves to a seventh step when operation instructions OPE are supplied, whereas program moves to a tenth step when operation instructions OPE are not supplied (V6 in FIG. 6).

In a seventh step, the marked data is updated according to operation instructions OPE (V7 in FIG. 6).

In an eighth step, program moves to a ninth step when sensing data SENS is supplied, whereas program moves to a tenth step when sensing data SENS is not supplied (V8 in FIG. 6).

In the ninth step, marked data is updated according to sensing data SENS (V9 in FIG. 6).

In a tenth step, when the marked data is updated in the seventh step or the ninth step, the program moves to an eleventh step, whereas when the marked data is not updated, the program moves to a thirteenth step (V10 in FIG. 6).

In an eleventh step, the predetermined number of images is selected according to the updated marked data (V11 in FIG. 6).

In a twelfth step, image data VIDEO containing the selected images is generated (V12 in FIG. 6).

In a thirteenth step, program is recovered from interrupt (V13 in FIG. 6).

The data processor 100 includes the arithmetic unit 110 which determines marked data according to operation instructions OPE supplied from the input portion 140 and/or sensing data SENS supplied from the sensor portion 150 and generates image data VIDEO using the marked data, and the display portion 130 which displays image data VIDEO; thus, images selected from a plurality of images according to the marked data can be displayed on the display portion 130 in a predetermined order. With this structure, a novel data processor which can display a plurality of images arranged in a predetermined order, a novel method for displaying data, or a novel program can be provided.

Note that this embodiment can be combined with any of the other embodiments in this specification as appropriate.

Embodiment 4

In this embodiment, a structure of the data processor of one embodiment of the present invention will be described with reference to FIGS. 7A, 7B1, 7B2, 7C1, and 7C2 and FIGS. 8A and 8B.

FIGS. 7A to 7C2 illustrate a structure of the data processor of one embodiment of the present invention.

FIG. 7A illustrates the external appearance of the data processor 100 of one embodiment of the present invention.

FIG. 7B1 shows a method by which an arithmetic portion selects which images to display on a display portion. FIG.

7B2 is a schematic view showing the display portion 130 displaying image data VIDEO generated by the arithmetic portion.

FIG. 7C1 shows a method which is different from the method by which the arithmetic portion selects images shown in FIG. 7B1. FIG. 7C2 shows a state in which images are displayed, that is different from the state shown in FIG. 7B2.

Figure 8A:
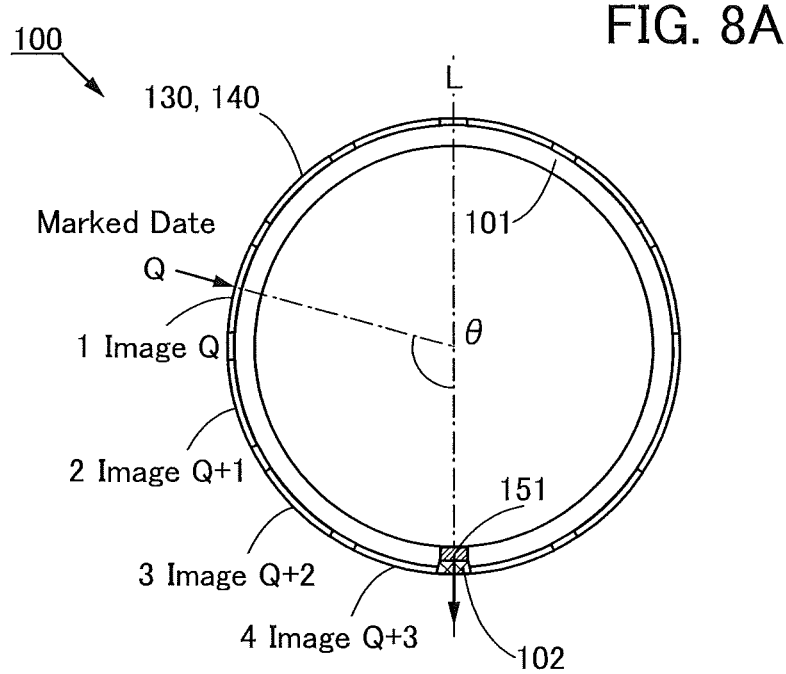
FIGS. 8A and 8B are schematic views showing a method in which an arithmetic portion of a data processor of one embodiment generates an image.
Figure 8B:
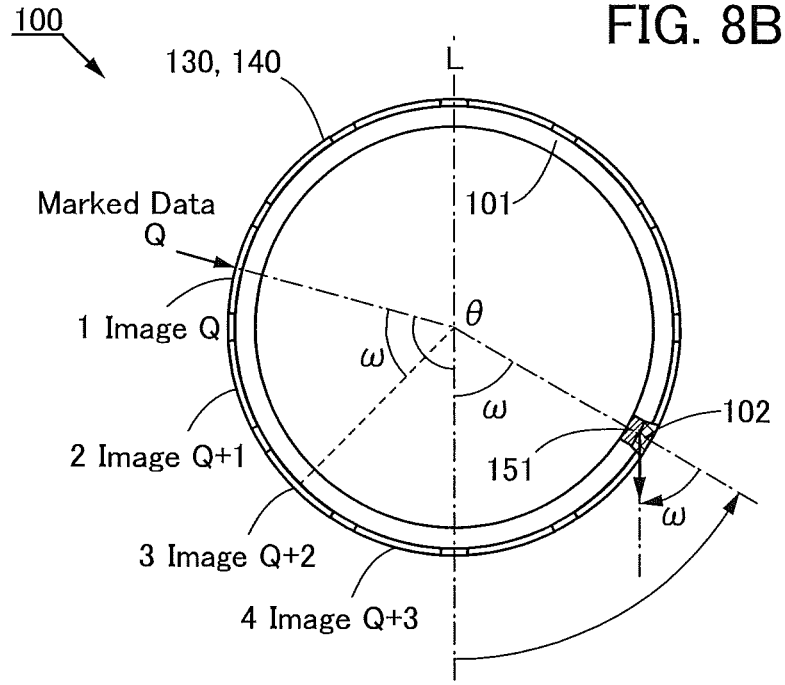

FIGS. 8A and 8B are side views of a data processor of one embodiment of the present invention.

FIG. 8B is a side view of the external appearance of the ring-shaped data processor 100 of one embodiment of the present invention shown in FIG. 8A, which is rotated at an angle of ω around the center.

Structure Example 1 of Data Processor

The data processor 100 in this embodiment has the same structure as that in Embodiment 1 to 3 except that the display portion 130 is flexible and provided on a ring-shaped housing 101.

The data processor 100 includes the display portion 130 on the ring-shaped housing 101; thus, images selected from a plurality of images according to the marked data can be displayed in a predetermined order on the display portion 130 along the ring-shaped housing 101. With this structure, a novel data processor which can display a plurality of images arranged in a predetermined order, or a novel method for displaying data can be provided.

The data processor 100 includes the input portion 140 overlapped with the display portion 130 and a clasp 102 by which the ring-shaped housing 101 is opened and closed.

Units constituting the data processor 100 are described below. Note that these units cannot be clearly distinguished from each other and one unit also serves as another unit or includes part of another unit in some cases.

For example, a display panel with which a touch panel is overlapped serves as both the input portion 140 and the display portion 130.

Note that the data processor 100 in this embodiment is different from that in Embodiment 1 to 3 in that it includes the housing 101 provided with the input/output unit 120 and the arithmetic unit 110, the clasp 102 by which the ring-shaped housing 101 is opened and closed, the input portion 140 overlapped with the display portion 130, and in that the display portion 130 is flexible and provided so that images can be displayed along the closed ring-shaped housing 101. Different parts will be described in detail below, and the above description is referred to for the other similar parts.

Housing and Clasp

The housing 101 has a band shape or a belt shape that can form a ring shape. In addition, the input/output unit 120 and the arithmetic unit 110 are provided (see FIG. 7A).

The housing 101 includes the clasp 102 by which the ring-shaped housing 101 is opened and closed (see FIGS. 7B2 and 7C2).

A user of the data processor 100 including the housing 101 can wear it like a wristwatch, for example.

Display Portion

The display portion 130 is flexible and provided so that images can be displayed along the closed ring-shaped housing 101.

The display portion 130 includes a display element. As the display element, for example, organic electroluminescent elements, display elements (electronic ink) that perform display by an electrophoretic method, an electronic liquid powder method, or the like, MEMS shutter display elements, optical interference type MEMS display elements can be used. A structure suitable for employed display elements can be selected from among a variety of structures of pixel circuits.

Specific examples of a structure that can be employed in the display portion 130 are described in Embodiments 6 and 7.

Input Portion

The input portion 140 includes a sensor to sense a finger, a stylus, or the like which comes close to or comes into contact with the input portion 140. The input portion 140 is provided to be overlapped with the display portion 130. With this structure, the coordinates of a finger or the like which comes close to or comes into contact with the input portion 140 can be associated with the coordinates of an image displayed on the display portion 130. Note that the input portion 140 overlapped with the display portion 130 can be referred to as a touch panel.

An electrostatic capacitor, a photoelectric conversion element, or the like can be used as a sensor in the input portion 140.

The input portion 140 senses a gesture (e.g., tap, drag, swipe, or pinch-in) made by a finger used as a pointer touching the input portion 140, so that operation instructions OPE can be given.

Note that the input portion 140 may supply the coordinate data of a finger or the like touching the input portion 140, and the arithmetic unit 110 may analyze the supplied coordinate data to call up associated operation instructions OPE.

Method 1 for Generating Image Data VIDEO

A method by which the arithmetic portion 111 generates image data VIDEO that is displayed on the display portion 130 will be described with reference to FIGS. 7B1 and 7B2.

In a first step, initial image data is displayed on the display portion 130.

In a second step, an image is selected from the initial image data and the input portion 140 supplies operation instructions OPE to update data marked as a starting point.

For example, when a user of the data processor 100 touches the input portion 140, which is overlapped with the display portion 130 displaying the image, with a finger, the input portion 140 supplies the coordinate data of the portion touched by the finger. The arithmetic unit 110 checks the supplied coordinate data against the coordinate data of a plurality of images contained in the initial image data to specify the number associated with the image which is indicated by the coordinate data.

In a third step, the marked data is updated to Q.

In a fourth step, R images (i.e., Q-th to (Q+R−1)-th images) are selected and arranged in numerical order to form image data VIDEO (see FIG. 7B1).

Specifically, in image data VIDEO, the Q-th image and the (Q+R−1)-th image are displayed at one end and at the other end, respectively.

In a fifth step, the display portion 130 is supplied with image data VIDEO and displays image data VIDEO (see FIG. 7B2).

Method 2 for Generating Image Data VIDEO

A method by which the arithmetic portion 111 generates image data VIDEO that is displayed on the display portion 130 will be described with reference to FIGS. 7C1 and 7C2. Note that fourth and fifth steps in the method described here are different from those in the above-described method and thus different steps will be described in detail below. Refer to the above description for portions where the same steps can be employed.

In a fourth step, R images (i.e., Q−r(1)-th to (Q+r(2)−1)-th images) are selected and arranged in numerical order to form image data VIDEO (see FIG. 7C1). Note that r(1) and r(2) are both natural numbers and r(1)+r(2)=R.

Specifically, in image data VIDEO, the Q−r(1)-th image and the (Q+r(2)−1)-th image are displayed at one end and at the other end, respectively.

In a fifth step, the display portion 130 is supplied with image data VIDEO and displays image data VIDEO (see FIG. 7C2).

Method 3 for Generating Image Data VIDEO

Another method by which the arithmetic portion 111 generates image data VIDEO that is displayed on the display portion 130 will be described with reference to FIGS. 8A and 8B.

Specifically, the method described here is used when the data processor 100 is in the form of a ring. By the method, image data VIDEO is generated so that a predetermined image can be displayed in a predetermined direction on the display portion on the outer side of the ring even when the data processor 100 is rotated.

In the data processor 100, the acceleration sensor 151 which can sense the inclination of the data processor 100 is provided near the clasp 102.

A side view of the data processor 100 in FIG. 8A shows the clasp 102 at the lowermost position. Note that dashed-dotted line L is a perpendicular line through the center of the ring-shaped housing 101.

An image associated with data marked as a starting point that is, Q-th image, is displayed in a direction inclined at an angle θ from the perpendicular line L, a Q-th image is displayed in a direction inclined at the angle θ from the perpendicular line L.

In a side view in FIG. 8B, the clasp 102 rotates at an angle ω from the perpendicular line L. Note that the acceleration sensor 151 senses the angle ω.

In a first step, sensing data SENS containing the angle ω that is sensed by the acceleration sensor 151 is supplied.

In a second step, when the angle ω exceeds a predetermined value, the arithmetic portion 111 generates image data VIDEO so that ω is cancelled out.

For example, as shown in FIG. 8B, when the data processor 100 is inclined to the left at the angle ω from the state of FIG. 8A, image data VIDEO in which the Q-th image is slid to the right is generated so as to cancel out the angle ω, whereby the Q-th image can be displayed in the same direction. As a result, the Q-th image can be displayed in a direction inclined at the angle θ from the perpendicular line L even when the data processor 100 is rotated around the center of the ring.

This embodiment can be combined with any of the other embodiments in this specification as appropriate.

Embodiment 5

In this embodiment, a structure of a display panel that can be used in a position input portion of the data processor and the display device of one embodiment of the present invention is described with reference to FIGS. 9A to 9C. Note that the display panel described in this embodiment includes a touch sensor (a contact sensor device) that overlaps with a display portion; thus, the display panel can be called a touch panel (an input/output device).

Figure 9A:
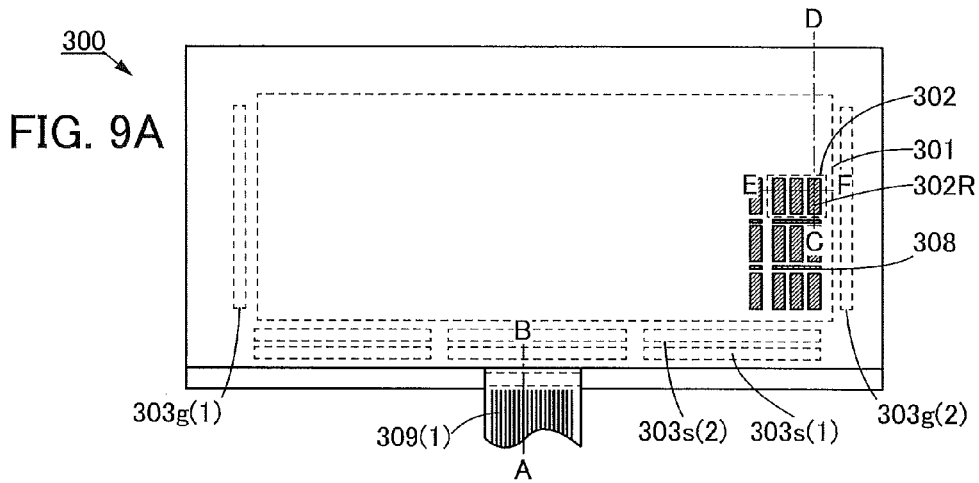
FIGS. 9A to 9C illustrate a structure of a display panel that can be used for a display device of one embodiment.

FIG. 9A is a plan view illustrating the structure of a display panel that can be used in the position input portion of the data processor and the display device of one embodiment of the present invention.

Figure 9B:
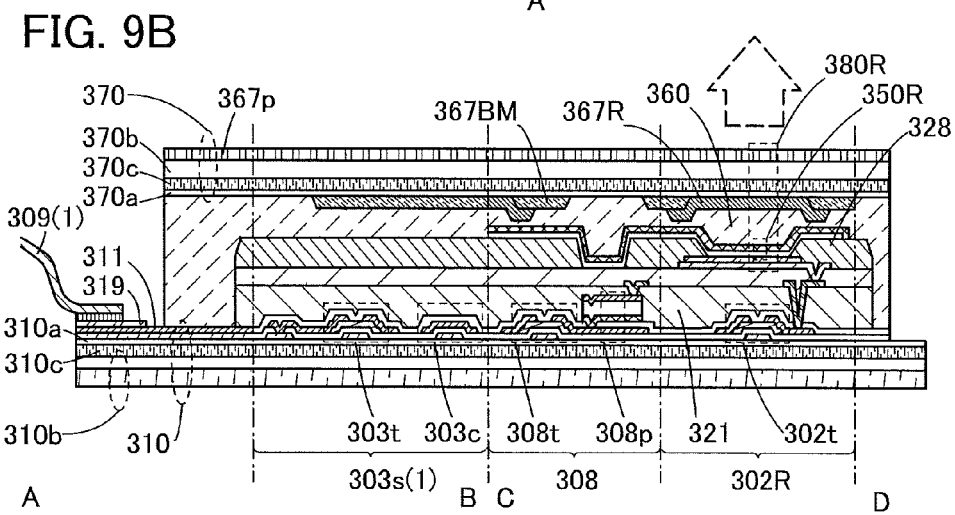

FIG. 9B is a cross-sectional view taken along line A-B and line C-D in FIG. 9A.

Figure 9C:
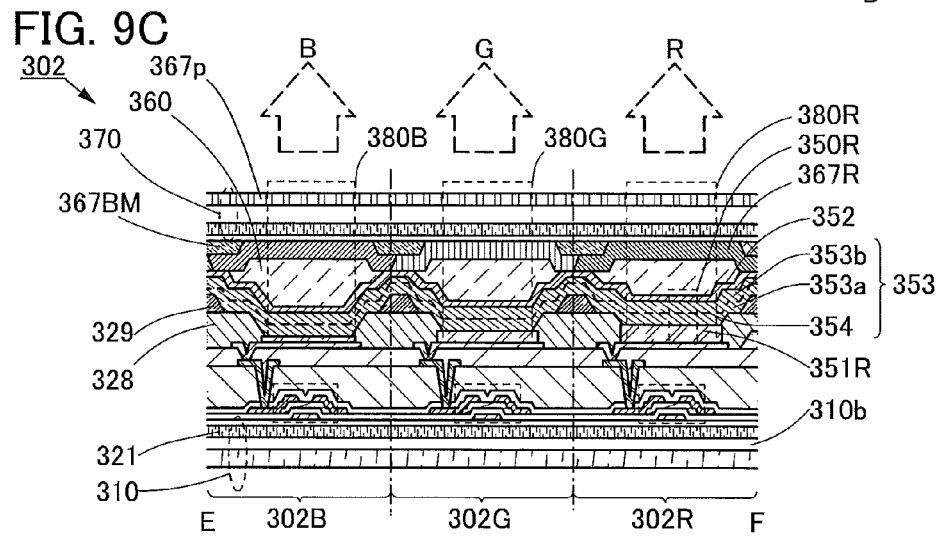

FIG. 9C is a cross-sectional view taken along line E-F in FIG. 9A.

Top View

An input/output device 300 described as an example in this embodiment includes a display portion 301 (see FIG. 9A).

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, in the sub-pixels, light-emitting elements and pixel circuits that can supply electric power for driving the light-emitting elements are provided.

The pixel circuits are electrically connected to wirings through which selection signals are supplied and wirings through which image signals are supplied.

Furthermore, the input/output device 300 is provided with a scan line driver circuit 303g(1) that can supply selection signals to the pixels 302 and an image signal line driver circuit 303s(1) that can supply image signals to the pixels 302. Note that when the image signal line driver circuit 303s(1) is placed in a portion other than a bendable portion, malfunction can be inhibited.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time it takes for an imaging pixel circuit to detect light.

The input/output device 300 is provided with an imaging pixel driver circuit 303g(2) that can supply control signals to the imaging pixels 308 and an imaging signal line driver circuit 303s(2) that reads out imaging signals. Note that when the imaging signal line driver circuit 303s(2) is placed in a portion other than a bendable portion, malfunction can be inhibited.

Cross-Sectional View

The input/output device 300 includes a substrate 310 and a counter substrate 370 that faces the substrate 310 (see FIG. 9B).

The substrate 310 is a stacked body in which a substrate 310b having flexibility, a barrier film 310a that prevents diffusion of unintentional impurities to the light-emitting elements, and an adhesive layer 310c that attaches the barrier film 310a to the substrate 310b are stacked.

The counter substrate 370 is a stacked body including a substrate 370b having flexibility, a barrier film 370a that prevents diffusion of unintentional impurities to the light-emitting elements, and an adhesive layer 370c that attaches the barrier film 370a to the substrate 370b (see FIG. 9B).

A sealant 360 attaches the counter substrate 370 to the substrate 310. The sealant 360, also serving as an optical adhesive layer, has a refractive index higher than that of air. The pixel circuits and the light-emitting elements (e.g., a first light-emitting element 350R) and the imaging pixel circuits and photoelectric conversion elements (e.g., a photoelectric conversion element 308p) are provided between the substrate 310 and the counter substrate 370.

Structure of Pixel

Each of the pixels 302 includes the sub-pixel 302R, a sub-pixel 302G, and a sub-pixel 302B (see FIG. 9C). The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit that can supply electric power to the first light-emitting element 350R and includes a transistor 302t (see FIG. 9B). Furthermore, the light-emitting module 380R includes the first light-emitting element 350R and an optical element (e.g., a coloring layer 367R).

The transistor 302t includes a semiconductor layer. A variety of semiconductor films such as an amorphous silicon film, a low-temperature polysilicon film, a single crystal silicon film, and an oxide semiconductor film can be used for the semiconductor layer of the transistor 302t. The transistor 302t may include a back gate electrode, with which the threshold value of the transistor 302t may be controlled.

The first light-emitting element 350R includes a first lower electrode 351R, an upper electrode 352, and a layer 353 containing a light-emitting organic compound between the first lower electrode 351R and the upper electrode 352 (see FIG. 9C).

The layer 353 containing a light-emitting organic compound includes a light-emitting unit 353a, a light-emitting unit 353b, and an intermediate layer 354 between the light-emitting units 353a and 353b.

The light-emitting module 380R includes the first coloring layer 367R on the counter substrate 370. The coloring layer transmits light of a particular wavelength and is, for example, a layer that selectively transmits light of red, green, or blue color. A region that transmits light emitted from the light-emitting element as it is may be provided as well.

The light-emitting module 380R, for example, includes the sealant 360 that is in contact with the first light-emitting element 350R and the first coloring layer 367R.

The first coloring layer 367R is positioned in a region overlapping with the first light-emitting element 350R. Accordingly, part of light emitted from the first light-emitting element 350R passes through the sealant 360 that also serves as an optical adhesive layer and through the first coloring layer 367R and is emitted to the outside of the light-emitting module 380R as indicated by arrows in FIGS. 9B and 9C.

Structure of Input/Output Device

The input/output device 300 includes a light-blocking layer 367BM on the counter substrate 370. The light-blocking layer 367BM is provided so as to surround the coloring layer (e.g., the first coloring layer 367R).

The input/output device 300 includes an anti-reflective layer 367p positioned in a region overlapping with the display portion 301. As the anti-reflective layer 367p, a circular polarizing plate can be used, for example.

The input/output device 300 includes an insulating film 321. The insulating film 321 covers the transistor 302t. Note that the insulating film 321 can be used as a layer for planarizing unevenness caused by the pixel circuits. An insulating film on which a layer that can prevent diffusion of impurities to the transistor 302t and the like is stacked can be used as the insulating film 321.

The input/output device 300 includes the light-emitting elements (e.g., the first light-emitting element 350R) over the insulating film 321.

The input/output device 300 includes, over the insulating film 321, a partition wall 328 that overlaps with an end portion of the first lower electrode 351R (see FIG. 9C). In addition, a spacer 329 that controls the distance between the substrate 310 and the counter substrate 370 is provided on the partition wall 328.

Structure of Image Signal Line Driver Circuit

The image signal line driver circuit 303s(1) includes a transistor 303t and a capacitor 303c. Note that the image signal line driver circuit 303s(1) can be formed in the same process and over the same substrate as those of the pixel circuits.

Structure of Imaging Pixel

The imaging pixels 308 each include a photoelectric conversion element 308p and an imaging pixel circuit for sensing light received by the photoelectric conversion element 308p. The imaging pixel circuit includes a transistor 308t.

For example, a PIN photodiode can be used as the photoelectric conversion element 308p.

Other Structures

The input/output device 300 includes a wiring 311 through which a signal can be supplied. The wiring 311 is provided with a terminal 319. Note that an FPC 309(1) through which a signal such as an image signal or a synchronization signal can be supplied is electrically connected to the terminal 319. The FPC 309(1) is preferably placed in a portion other than a bendable portion of the input/output device 300. Moreover, the FPC 309(1) is preferably placed at almost the center of one side of a region surrounding the display portion 301, especially a side which is folded (a longer side in FIG. 9A). Accordingly, the distance between an external circuit for driving the input/output device 300 and the input/output device 300 can be made short, resulting in easy connection. Furthermore, the center of gravity of the external circuit can be made almost the same as that of the input/output device 300. As a result, an information processor can be treated easily and mistakes such as dropping can be prevented.

Note that a printed wiring board (PWB) may be attached to the FPC 309(1).

Note that although the case where the light-emitting element is used as a display element is illustrated, one embodiment of the present invention is not limited thereto.

For example, in this specification and the like, a display element, a display device which is a device including a display element, a light-emitting element, and a light-emitting device which is a device including a light-emitting element can employ a variety of modes or can include a variety of elements. Examples of a display element, a display device, a light-emitting element, or a light-emitting device include an EL (electroluminescent) element (e.g., an EL element including organic and inorganic materials, an organic EL element, or an inorganic EL element), an LED (e.g., a white LED, a red LED, a green LED, or a blue LED), a transistor (a transistor which emits light depending on current), an electron emitter, a liquid crystal element, electronic ink, an electrophoretic element, a grating light valve (GLV), a plasma display panel (PDP), a micro electro mechanical system (MEMS), a digital micromirror device (DMD), a digital micro shutter (DMS), MIRASOL (registered trademark), an interferometric modulator display (IMOD) element, an electrowetting element, a piezoelectric ceramic display, or a carbon nanotube, which are display media whose contrast, luminance, reflectivity, transmittance, or the like is changed by electromagnetic action. Note that examples of display devices having EL elements include an EL display. Display devices having electron emitters include a field emission display (FED), an SED-type flat panel display (SED: surface-conduction electron-emitter display), and the like. Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). An example of a display device including electronic ink or electrophoretic elements is electronic paper.

This embodiment can be combined with any of the other embodiments in this specification as appropriate.

Embodiment 6

In this embodiment, a structure of a display panel that can be used in the position input portion of the data processor and the display device of one embodiment of the present invention is described with reference to FIGS. 10A and 10B and FIG. 11. Note that the display panel described in this embodiment includes a touch sensor (a contact sensor device) that overlaps with a display portion; thus, the display panel can be called a touch panel (an input/output device).

Figure 10A:
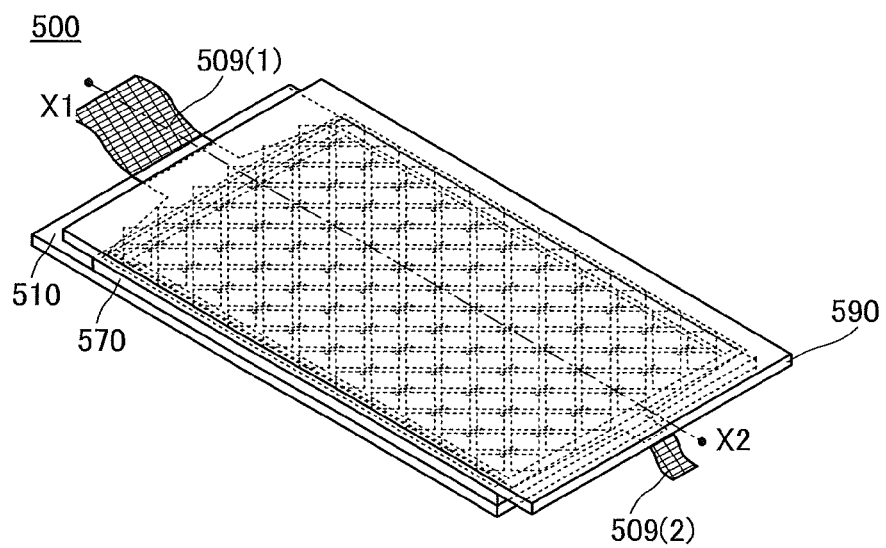
FIGS. 10A and 10B illustrate a structure of a display panel that can be used for a display device of one embodiment.

FIG. 10A is a schematic perspective view of a touch panel 500 described as an example in this embodiment. Note that FIGS. 10A and 10B illustrate only main components for simplicity. FIG. 10B is a developed view of the schematic perspective view of the touch panel 500.

Figure 11:
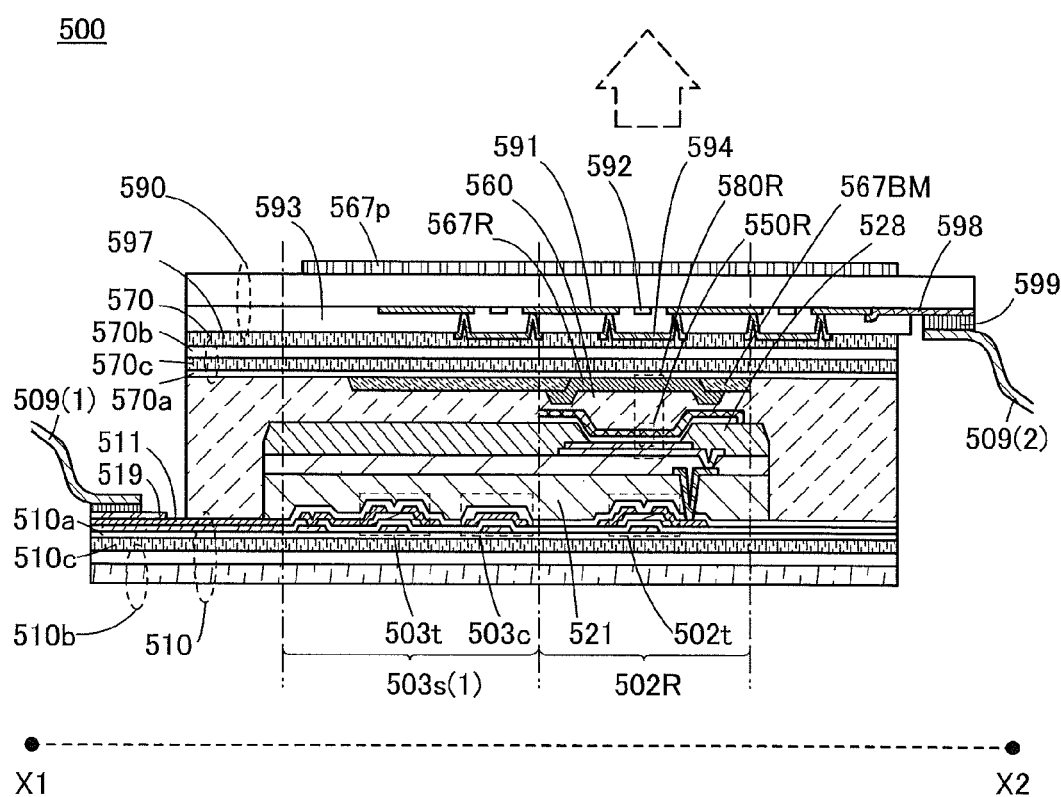
FIG. 11 illustrates a structure of a display panel that can be used for a display device of one embodiment.

FIG. 11 is a cross-sectional view of the touch panel 500 taken along line X1-X2 in FIG. 10A.

Figure 10B:
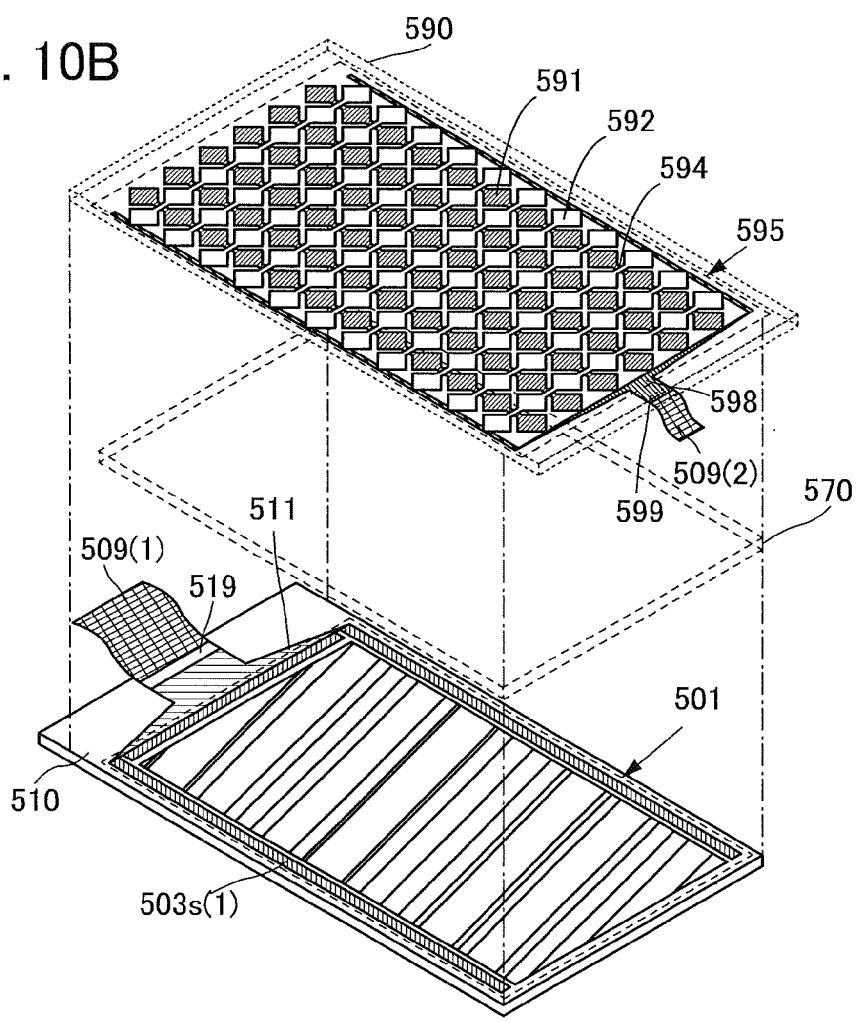

The touch panel 500 includes a display portion 501 and a touch sensor 595 (see FIG. 10B). Furthermore, the touch panel 500 includes a substrate 510, a substrate 570, and a substrate 590. Note that the substrate 510, the substrate 570, and the substrate 590 each have flexibility.

Note that in this specification and the like, a transistor can be formed using any of a variety of substrates, for example. The type of a substrate is not limited to a certain type. As the substrate, a semiconductor substrate (e.g., a single crystal substrate or a silicon substrate), an SOI substrate, a glass substrate, a quartz substrate, a plastic substrate, a metal substrate, a stainless steel substrate, a substrate including stainless steel foil, a tungsten substrate, a substrate including tungsten foil, a flexible substrate, an attachment film, paper including a fibrous material, a base material film, or the like can be used, for example. As an example of a glass substrate, a barium borosilicate glass substrate, an aluminoborosilicate glass substrate, a soda lime glass substrate, or the like can be given. Examples of a flexible substrate include a flexible synthetic resin such as plastics typified by polyethylene terephthalate (PET), polyethylene naphthalate (PEN), and polyether sulfone (PES), and acrylic. Examples of the material for the bonding film include polypropylene, polyester, vinyl, polyvinyl fluoride, and polyvinyl chloride. Examples of the material for the base film include polyester, polyamide, polyimide, inorganic vapor deposition film, and paper. Specifically, the use of semiconductor substrates, single crystal substrates, SOI substrates, or the like enables the manufacture of small-sized transistors with a small variation in characteristics, size, shape, or the like and with high current capability. A circuit using such transistors achieves lower power consumption of the circuit or higher integration of the circuit.

The display portion 501 includes the substrate 510, a plurality of pixels over the substrate 510, and a plurality of wirings 511 through which signals are supplied to the pixels. The plurality of wirings 511 is led to a peripheral portion of the substrate 510, and part of the plurality of wirings 511 forms a terminal 519. The terminal 519 is electrically connected to an FPC 509(1).

Touch Sensor

The substrate 590 includes the touch sensor 595 and a plurality of wirings 598 electrically connected to the touch sensor 595. The plurality of wirings 598 is led to a peripheral portion of the substrate 590, and part of the plurality of wirings 598 forms a terminal for electrical connection to an FPC 509(2). Note that in FIG. 10B, electrodes, wirings, and the like of the touch sensor 595 provided on the back side of the substrate 590 (the side opposite to the viewer side) are indicated by solid lines for clarity.

As a touch sensor used as the touch sensor 595, a capacitive touch sensor is preferably used. Examples of the capacitive touch sensor are a surface capacitive touch sensor and a projected capacitive touch sensor. Examples of the projected capacitive touch sensor are a self capacitive touch sensor and a mutual capacitive touch sensor, which differ mainly in the driving method. The use of a mutual capacitive touch sensor is preferable because multiple points can be sensed simultaneously.

An example of using a projected capacitive touch sensor is described below with reference to FIG. 10B. Note that a variety of sensors that can sense the closeness or the contact of a sensing target such as a finger can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrode 592 is in the form of a series of quadrangles arranged in one direction as illustrated in FIGS. 10A and 10B. Each of the electrodes 591 is in the form of a quadrangle. A wiring 594 electrically connects two electrodes 591 arranged in a direction intersecting with the direction in which the electrode 592 extends. The intersecting area of the electrode 592 and the wiring 594 is preferably as small as possible. Such a structure allows a reduction in the area of a region where the electrodes are not provided, reducing unevenness in transmittance. As a result, unevenness in luminance of light from the touch sensor 595 can be reduced.

Note that the shapes of the electrodes 591 and the electrodes 592 are not limited to the above-mentioned shapes and can be any of a variety of shapes. For example, the plurality of electrodes 591 may be provided so that space between the electrodes 591 are reduced as much as possible, and a plurality of electrodes 592 may be provided with an insulating layer sandwiched between the electrodes 591 and the electrodes 592 and may be spaced apart from each other to form a region not overlapping with the electrodes 591. In that case, between two adjacent electrodes 592, it is preferable to provide a dummy electrode which is electrically insulated from these electrodes, whereby the area of a region having a different transmittance can be reduced.

The structure of the touch panel 500 is described with reference to FIG. 11.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591 to each other.

An adhesive layer 597 attaches the substrate 590 to the substrate 570 so that the touch sensor 595 overlaps with the display portion 501.

The electrodes 591 and the electrodes 592 are formed using a light-transmitting conductive material. As a light-transmitting conductive material, a conductive oxide such as indium oxide, indium tin oxide, indium zinc oxide, zinc oxide, or zinc oxide to which gallium is added can be used.

The electrodes 591 and the electrodes 592 may be formed by depositing a light-transmitting conductive material on the substrate 590 by a sputtering method and then removing an unnecessary portion by any of various patterning techniques such as photolithography.

The insulating layer 593 covers the electrodes 591 and the electrodes 592. Examples of a material for the insulating layer 593 are a resin such as acrylic or epoxy resin, a resin having a siloxane bond, and an inorganic insulating material such as silicon oxide, silicon oxynitride, or aluminum oxide.

Furthermore, openings reaching the electrodes 591 are formed in the insulating layer 593, and the wiring 594 electrically connects the adjacent electrodes 591. The wiring 594 is preferably formed using a light-transmitting conductive material, in which case the aperture ratio of the touch panel can be increased. Moreover, the wiring 594 is preferably formed using a material that has higher conductivity than those of the electrodes 591 and the electrodes 592.

One electrode 592 extends in one direction, and a plurality of electrodes 592 is provided in the form of stripes.

The wiring 594 intersects with the electrode 592.

Adjacent electrodes 591 are provided with one electrode 592 provided therebetween and are electrically connected by the wiring 594.

Note that the plurality of electrodes 591 is not necessarily arranged in the direction orthogonal to one electrode 592 and may be arranged to intersect with one electrode 592 at an angle of less than 90 degrees.

One wiring 598 is electrically connected to any of the electrodes 591 and 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

Furthermore, a connection layer 599 electrically connects the wiring 598 to the FPC 509(2).

As the connection layer 599, any of various anisotropic conductive films (ACF), anisotropic conductive pastes (ACP), or the like can be used.

The adhesive layer 597 has a light-transmitting property. For example, a thermosetting resin or an ultraviolet curable resin can be used; specifically, a resin such as an acrylic resin, an urethane resin, an epoxy resin, or a resin having a siloxane bond can be used.

Display Portion

The touch panel 500 includes a plurality of pixels arranged in a matrix. Each of the pixels includes a display element and a pixel circuit for driving the display element.

In this embodiment, an example of using an organic electroluminescent element that emits white light as a display element will be described; however, the display element is not limited to such element.

As the display element, for example, in addition to organic electroluminescent elements, any of a variety of display elements such as display elements (electronic ink) that perform display by an electrophoretic method, an electronic liquid powder method, or the like; MEMS shutter display elements; and optical interference type MEMS display elements can be used. Note that a structure suitable for employed display elements can be selected from among a variety of structures of pixel circuits.

The substrate 510 is a stacked body in which a flexible substrate 510b, a barrier film 510a that prevents diffusion of unintentional impurities to the light-emitting elements, and an adhesive layer 510c that attaches the barrier film 510a to the substrate 510b are stacked.

The substrate 570 is a stacked body in which a flexible substrate 570b, a barrier film 570a that prevents diffusion of unintentional impurities to the light-emitting elements, and an adhesive layer 570c that attaches the barrier film 570a to the substrate 570b are stacked.

A sealant 560 attaches the substrate 570 to the substrate 510. The sealant 560, also serving as an optical adhesive layer, has a refractive index higher than that of air. The pixel circuits and the light-emitting elements (e.g., a first light-emitting element 550R) are provided between the substrate 510 and the substrate 570.

Structure of Pixel

A pixel includes a sub-pixel 502R, and the sub-pixel 502R includes a light-emitting module 580R.

The sub-pixel 502R includes the first light-emitting element 550R and the pixel circuit that can supply electric power to the first light-emitting element 550R and includes a transistor 502t. Furthermore, the light-emitting module 580R includes the first light-emitting element 550R and an optical element (e.g., a coloring layer 567R).

The light-emitting element 550R includes a lower electrode, an upper electrode, and a layer containing a light-emitting organic compound between the lower electrode and the upper electrode.

The light-emitting module 580R includes the first coloring layer 567R on the counter substrate 570. The coloring layer transmits light of a particular wavelength and is, for example, a layer that selectively transmits light of red, green, or blue color. A region that transmits light emitted from the light-emitting element as it is may be provided as well.

The light-emitting module 580R includes the sealant 560 that is in contact with the first light-emitting element 550R and the first coloring layer 567R.

The first coloring layer 567R is positioned in a region overlapping with the first light-emitting element 550R. Accordingly, part of light emitted from the first light-emitting element 550R passes through the sealant 560 that also serves as an optical adhesive layer and through the first coloring layer 567R and is emitted to the outside of the light-emitting module 580R as indicated by an arrow in FIG. 11.

Structure of Display Portion

The display portion 501 includes a light-blocking layer 567BM on the counter substrate 570. The light-blocking layer 567BM is provided so as to surround the coloring layer (e.g., the first coloring layer 567R).

The display portion 501 includes an anti-reflective layer 567p positioned in a region overlapping with pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness caused by the pixel circuits. An insulating film on which a layer that can prevent diffusion of impurities to the transistor 502t and the like is stacked can be used as the insulating film 521.

The display portion 501 includes the light-emitting elements (e.g., the first light-emitting element 550R) over the insulating film 521.

The display portion 501 includes, over the insulating film 521, a partition wall 528 that overlaps with an end portion of the lower electrode. In addition, a spacer that controls the distance between the substrate 510 and the substrate 570 is provided on the partition wall 528.

Structure of Image Signal Line Driver Circuit

An image signal line driver circuit 503s(1) includes a transistor 503t and a capacitor 503c. Note that the image signal line driver circuit 503s(1) can be formed in the same process and over the same substrate as those of the pixel circuits.

Other Structures

The display portion 501 includes the wirings 511 through which signals can be supplied. The wirings 511 are provided with the terminal 519. Note that the FPC 509(1) through which a signal such as an image signal or a synchronization signal can be supplied is electrically connected to the terminal 519.

Note that a printed wiring board (PWB) may be attached to the FPC 509(1).

This embodiment can be combined with any of the other embodiments in this specification as appropriate.

This application is according to Japanese Patent Application serial no. 2013-227913 filed with Japan Patent Office on Nov. 1, 2013, the entire contents of which are hereby incorporated by reference.

What is claimed is:
1. A data processor comprising:
an input/output unit comprising:
an input portion supplying operation instructions;
a display portion displaying images according to image data; and
an arithmetic unit,
wherein the display portion is configured to display R images according to Q-th image data to Q+R−1-th image data,
wherein the arithmetic unit determines marked data as a starting point in Q-th image to Q+R−1-th image according to the operation instructions, selects R image data from P images according to the marked data, and arranges and generates R image data starting from the marked data to display R images at the display portion (P, Q and R each are a natural number greater than or equal to 2, Q is less than or equal to P, and R is less than P),
wherein the Q-th image and the Q+R−1-th image are next to each other with a clasp interposed therebetween,
wherein the display portion comprises a photoelectric conversion element and a light-emitting element,
wherein the photoelectric conversion element comprises a region,
wherein the light-emitting element comprises a region,
wherein a partition wall and the region of the photoelectric conversion element do not overlap each other,
wherein the partition wall and the region of the light-emitting element do not overlap each other, and
wherein (P-R) images are not displayed at the display portion.
2. The data processor according to claim 1, wherein the display portion is flexible.
3. A housing including the display portion according to claim 1 forms a ring.
4. A method for displaying data using a data processor including an input/output unit and an arithmetic unit;
wherein the input/output unit comprises an input portion supplying operation instructions, and a display portion displaying images according to image data, and wherein the arithmetic unit comprises an arithmetic portion and a memory portion storing a program to be executed by the arithmetic portion, wherein the display portion is configured to display R images according to Q-th image data to Q+R−1-th image data, the program comprising the steps of:
preparing image data in a first step;
allowing interrupt processing in a second step;
displaying image data in a third step;
determining whether termination instructions are supplied in a sixth step in the interrupt processing, then moving to a fifth step when the termination instructions are supplied, or moving to the third step when the termination instructions are not supplied in a fourth step; and
terminating the program in the fifth step, and
the interrupt processing comprising the steps of:
determining whether the operation instructions are supplied, then moving to a seventh step when the operation instructions are supplied, or moving to a tenth step when the operation instructions are not supplied in the sixth step;
updating marked data as a starting point in Q-th image to Q+R−1-th image according to the operation instructions in the seventh step;
selecting R image data from P images according to the marked data in an eighth step;

arranging and generating R image data starting from the marked data to display R images at the display portion in a ninth (P, Q and R each are a natural number greater than or equal to 2, Q is less than or equal to P, and R is less than P); and recovering from the interrupt processing in the tenth step, wherein the Q-th image and the Q+R−1-th image are next to each other with a clasp interposed therebetween, wherein the display portion comprises a photoelectric conversion element and a light-emitting element, wherein the photoelectric conversion element comprises a region, wherein the light-emitting element comprises a region, wherein a partition wall and the region of the photoelectric conversion element do not overlap each other, wherein the partition wall and the region of the light-emitting element do not overlap each other, and wherein (P-R) images are not displayed at the display portion.

5. A data processor comprising:
an input/output unit comprising:
an input portion supplying operation instructions and sensing data;
a display portion displaying images according to image data; and
an arithmetic unit,
wherein the display portion is configured to display R images according to Q-th image data to Q+R−1-th image data,
wherein the arithmetic unit determines marked data as a starting point in Q-th image to Q+R−1-th image according to the operation instructions and the sensing data, selects R image data from P images according to the marked data, and arranges and generates R image data starting from the marked data to display R images at the display portion (P, Q and R each are a natural number greater than or equal to 2, Q is less than or equal to P, and R is less than P),
wherein the Q-th image and the Q+R−1-th image are next to each other with a clasp interposed therebetween,
wherein the display portion comprises a photoelectric conversion element and a light-emitting element,
wherein the photoelectric conversion element comprises a region,
wherein the light-emitting element comprises a region,
wherein a partition wall and the region of the photoelectric conversion element do not overlap each other,
wherein the partition wall and the region of the light-emitting element do not overlap each other, and
wherein (P-R) images are not displayed at the display portion.

6. The data processor according to claim 5, wherein the display portion is flexible.

7. A housing including the display portion according to claim 5 forms a ring.

8. A method for displaying data using a data processor including an input/output unit and an arithmetic unit,
wherein the input/output unit comprises an input portion supplying operation instructions and a sensing portion supplying a sensing data, and a display portion displaying images according to image data, and wherein the arithmetic unit comprises an arithmetic portion and a memory portion storing a program to be executed by the arithmetic portion, wherein the display portion is configured to display R images according to Q-th image data to Q+R−1-th image data, the program comprising the steps of:

preparing image data in a first step;
allowing interrupt processing in a second step;
displaying image data in a third step;
determining whether termination instructions are supplied in a sixth step in the interrupt processing, then moving to a fifth step when the termination instructions are supplied, or moving to the third step when the termination instructions are not supplied in a fourth step; and
terminating the program in the fifth step, and
the interrupt processing comprising the steps of:
determining whether the operation instructions are supplied, moving to a seventh step when the operation instructions are supplied, or moving to a eight step when the operation instructions are not supplied in the sixth step;
updating marked data as the starting point in Q-th image to Q+R−1-th image according to the operation instructions in the seventh step;
determining whether the sensing data are supplied, then moving to a tenth step when the operation instructions are supplied, or moving to a ninth step when the operation instructions are not supplied in a eighth step;
updating the marked data as the starting point according to the sensing data in the ninth step;
determining whether the marked data as the starting point is updated, then moving to an eleventh step when the marked data is updated, or moving to a thirteenth step when the marked data is not updated in the tenth step;
selecting R image data from P images according to the marked data in the eleventh step;
arranging and generating R image data starting from the marked data to display R images at the display portion (P, Q and R each are a natural number greater than or equal to 2, Q is less than or equal to P, and R is less than P) in a twelfth step; and
recovering from the interrupt processing in the thirteenth step, wherein the Q-th image and the Q+R−1-th image are next to each other with a clasp interposed therebetween,
wherein the display portion comprises a photoelectric conversion element and a light-emitting element,
wherein the photoelectric conversion element comprises a region,
wherein the light-emitting element comprises a region,
wherein a partition wall and the region of the photoelectric conversion element do not overlap each other,
wherein the partition wall and the region of the light-emitting element do not overlap each other, and
wherein (P-R) images are not displayed at the display portion.

9. The data processor according to claim 1,
wherein the display portion displays the R images according to the Q-th image data to Q+R−1-th image data at the same time.

10. The data processor according to claim 4,
wherein the display portion displays the R images according to the Q-th image data to Q+R−1-th image data at the same time.

11. The data processor according to claim 5,
wherein the display portion displays the R images according to the Q-th image data to Q+R−1-th image data at the same time.

12. The data processor according to claim 8,
wherein the display portion displays the R images according to the Q-th image data to Q+R−1-th image data at the same time.

* * * * *